| US010184474B2

(12) United States Patent
Karoliussen

(10) Patent No.: US 10,184,474 B2
(45) Date of Patent: Jan. 22, 2019

(54) DISPLACEMENT TYPE ROTARY MACHINE WITH CONTROLLING GEARS

(71) Applicant: Otechos AS, Tvedestrand (NO)

(72) Inventor: Hilberg I. Karoliussen, His (NO)

(73) Assignee: Otechos AS, Tvedestrand (NO)

( * ) Notice: Subject to any disclaimer, the term of this patent is extended or adjusted under 35 U.S.C. 154(b) by 73 days.

(21) Appl. No.: 14/762,141

(22) PCT Filed: Jan. 20, 2014

(86) PCT No.: PCT/NO2014/050011
§ 371 (c)(1),
(2) Date: Jul. 20, 2015

(87) PCT Pub. No.: WO2014/112885
PCT Pub. Date: Jul. 24, 2014

(65) Prior Publication Data
US 2015/0354570 A1 Dec. 10, 2015

(30) Foreign Application Priority Data

Jan. 21, 2013 (NO) .................................. 20130132

(51) Int. Cl.
*F02B 53/00* (2006.01)
*F04C 18/00* (2006.01)
(Continued)

(52) U.S. Cl.
CPC .............. *F04C 28/18* (2013.01); *F01C 1/077* (2013.01); *F01C 21/008* (2013.01); *F01C 21/08* (2013.01);
(Continued)

(58) Field of Classification Search
CPC ........ F04C 28/18; F04C 18/10; F04C 29/005; F02B 53/02; F02B 53/04; F02B 53/10;
(Continued)

(56) References Cited

U.S. PATENT DOCUMENTS 1,348,675 A    8/1920 Weed
1,921,747 A *  8/1933 Greve .................... F04C 2/077
                                                      418/36
(Continued)

FOREIGN PATENT DOCUMENTS

AT         504547 A1     6/2008
DE         2435823       2/1976
(Continued)

OTHER PUBLICATIONS

Norwegian Seach Report for Norwegian Application No. 20130132, reported Jul. 3, 2013.
(Continued)

*Primary Examiner* — Thai Ba Trieu
(74) *Attorney, Agent, or Firm* — Brinks Gilson & Lione

(57) ABSTRACT

A displacement type rotary machine with non-rotatable housing, two mutually movable co-axial rotors includes an outer rotor movable along housing inside wall, and an inner rotor movable relative to an inner circumferential face of the outer rotor. The outer rotor has radially inwardly directed wings. The inner rotor has a hub with radially outwardly directed wings. Each inner rotor wing is movable between a pair of the outer rotor wings to create chambers. A free end of the inner rotor wings is movable adjacent a curved inside wall of the outer rotor. A free end of the outer rotor wings is movable adjacent the hub. Both rotors are movable adjacent a first cover on the housing. The inner rotor is in movable adjacent a second cover on the outer rotor. Controlling gears control movement of the rotors, the gears including elliptical gearwheels and circular gearwheels.

31 Claims, 17 Drawing Sheets

(51) Int. Cl.
*F01C 1/00* (2006.01)
*F01C 1/077* (2006.01)
*F04C 28/18* (2006.01)
*F02B 53/12* (2006.01)
*F02B 53/10* (2006.01)
*F02B 53/04* (2006.01)
*F02B 53/02* (2006.01)
*F04C 18/10* (2006.01)
*F04C 29/00* (2006.01)
*F01C 21/00* (2006.01)
*F01C 21/08* (2006.01)
*F16H 1/28* (2006.01)
*F16H 35/00* (2006.01)

(52) U.S. Cl.
CPC ............. *F02B 53/02* (2013.01); *F02B 53/04* (2013.01); *F02B 53/10* (2013.01); *F02B 53/12* (2013.01); *F04C 18/10* (2013.01); *F04C 29/005* (2013.01); *F16H 2001/2881* (2013.01); *F16H 2035/003* (2013.01)

(58) Field of Classification Search
CPC .... F02B 53/12; F02B 55/10; F02B 2075/027; F01C 1/077; F01C 21/008; F01C 21/08; F01C 19/08; F16H 1/20
USPC .............................. 123/241, 245; 418/35–38
IPC .................................. F01C 1/077; F16H 35/02
See application file for complete search history.

(56) References Cited

U.S. PATENT DOCUMENTS

| | | | | |
|---|---|---|---|---|
| 3,034,486 A | * | 5/1962 | Buxton | F01C 1/063 418/36 |
| 3,061,180 A | * | 10/1962 | Durgin | F04C 18/077 418/36 |
| 3,112,062 A | | 11/1963 | Way | |
| 3,117,563 A | * | 1/1964 | Wiegert | F01C 1/22 123/242 |
| 3,203,405 A | * | 8/1965 | Sabet | F01C 1/077 418/36 |
| 3,356,079 A | | 12/1967 | Rolfsmeyer | |
| 3,430,573 A | | 3/1969 | Groeger | |
| 3,730,654 A | * | 5/1973 | McMahon | F01C 1/077 418/36 |
| 3,769,946 A | * | 11/1973 | Scherrer | F01C 1/063 418/36 |
| 3,930,415 A | | 1/1976 | Hoganson | |
| 3,955,428 A | * | 5/1976 | Ward | F16H 33/08 74/572.1 |
| 3,981,638 A | | 9/1976 | Hutterer | |
| 4,169,697 A | * | 10/1979 | Doundoulakis | F01C 1/07 418/34 |
| 4,844,708 A | | 7/1989 | Lopez | |
| 5,622,149 A | | 4/1997 | Wittry | |
| 7,222,601 B1 | * | 5/2007 | Kamenov | F01C 9/002 123/241 |
| 7,631,632 B2 | * | 12/2009 | Arov | F01C 1/077 123/241 |
| 7,827,956 B2 | * | 11/2010 | Ambardekar | F01C 1/077 123/245 |
| 8,297,253 B2 | * | 10/2012 | Kurowski | F01C 1/077 123/241 |
| 8,789,455 B2 | * | 7/2014 | Galceran Sole | F02B 53/00 475/162 |
| 2004/0187803 A1 | | 9/2004 | Regev | |
| 2012/0080006 A1 | | 4/2012 | Yeh | |

FOREIGN PATENT DOCUMENTS

| | | | | |
|---|---|---|---|---|
| DE | 4131847 C1 | * | 10/1992 | ............ F01C 1/077 |
| DE | 19740133 A1 | * | 3/1999 | ............ F01C 1/077 |
| DE | 19753134 A1 | * | 6/1999 | ............ F01C 1/077 |
| EP | 13947 A1 | * | 8/1980 | ............ F01C 1/077 |
| EP | 62087 A1 | * | 10/1982 | ............ F01C 1/077 |
| FR | 992725 A | | 10/1951 | |
| FR | 2778945 A1 | * | 5/1998 | ............ F01C 1/077 |
| GB | 1028098 A | | 5/1966 | |
| GB | 1031626 A | | 6/1966 | |
| GB | 2007771 A | | 5/1979 | |
| GB | 2262965 A | * | 7/1993 | ............ F01C 1/063 |
| JP | S4714509 | | 1/1972 | |
| JP | S50160607 | | 12/1975 | |
| JP | 2002516941 | | 6/2002 | |
| RU | 2067187 | | 9/1996 | |
| WO | 8605548 A1 | | 9/1986 | |
| WO | 9961751 | | 12/1999 | |
| WO | 03008764 A1 | | 1/2003 | |
| WO | 2012128493 A2 | | 9/2012 | |

OTHER PUBLICATIONS

International Search Report and Written Opinion for PCT/NO2014/050011, dated Dec. 19, 2014.
International Preliminary Report on Patentability for PCT/NO2014/050011, completed Apr. 24, 2015.

* cited by examiner

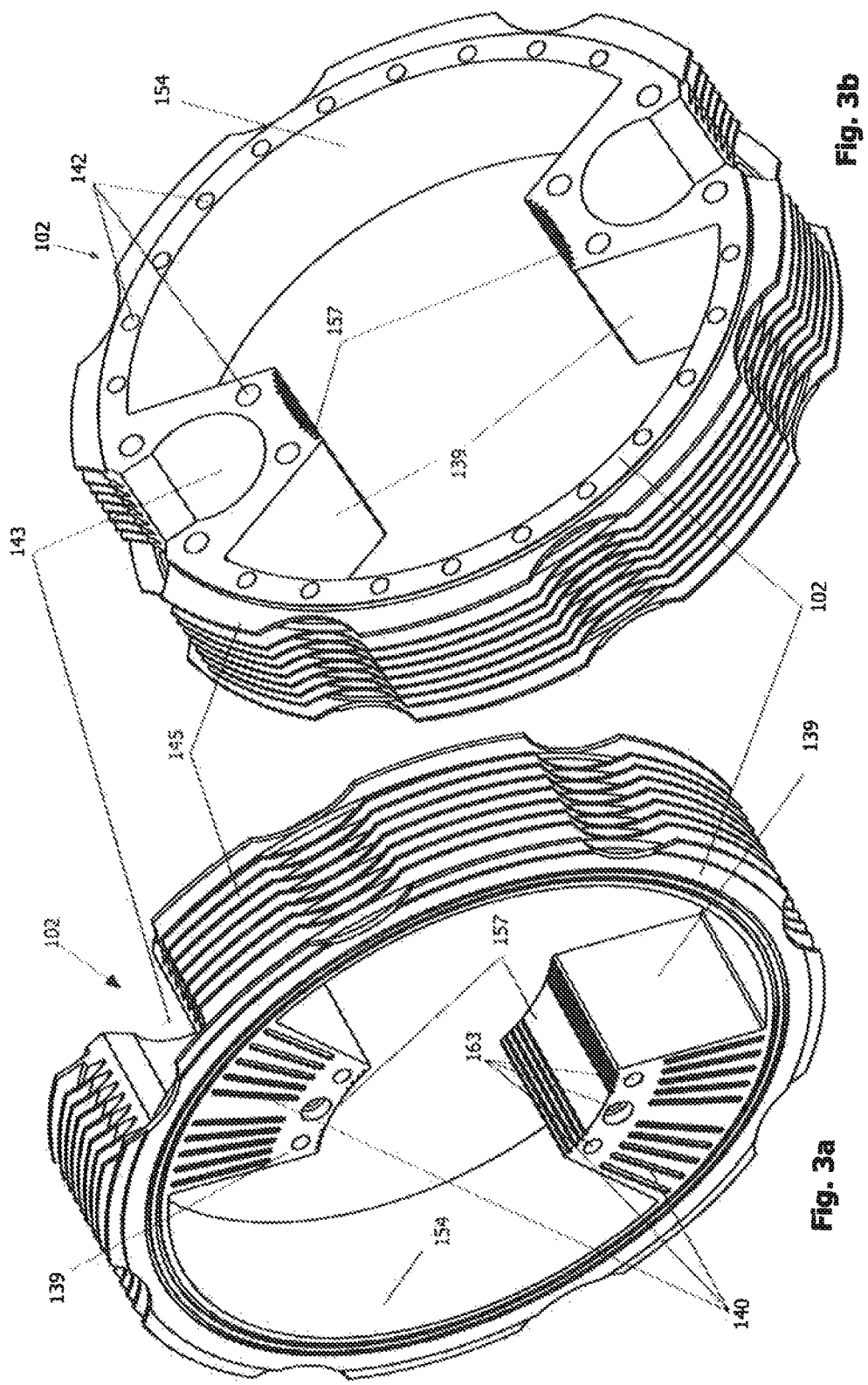

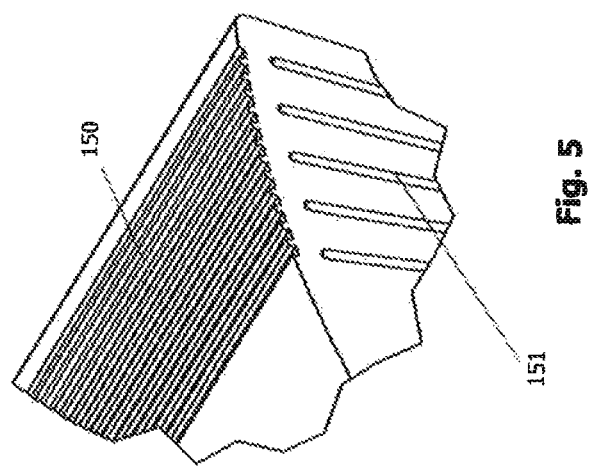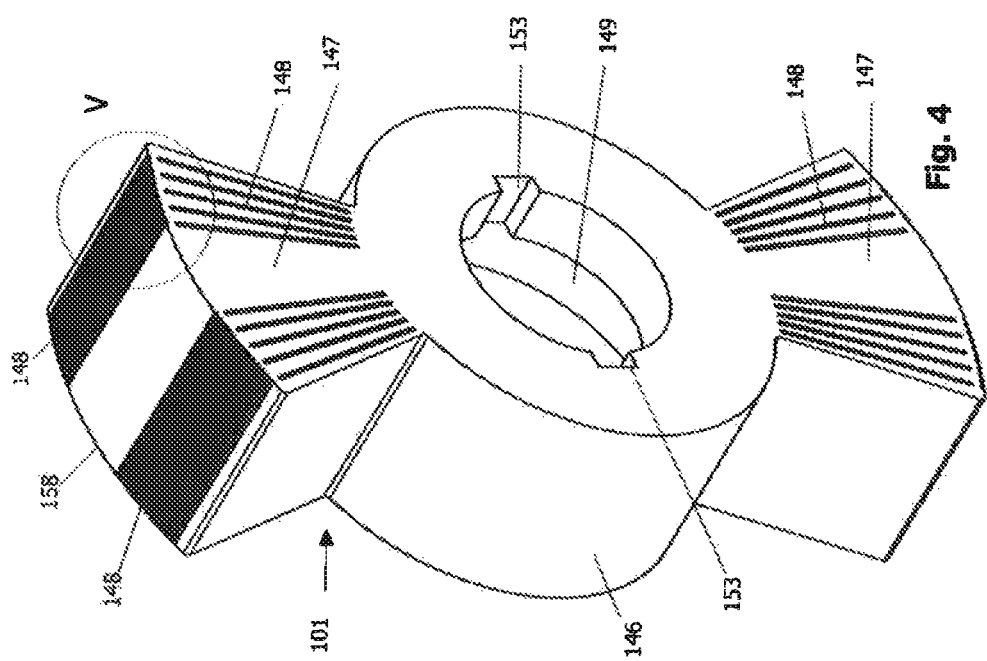

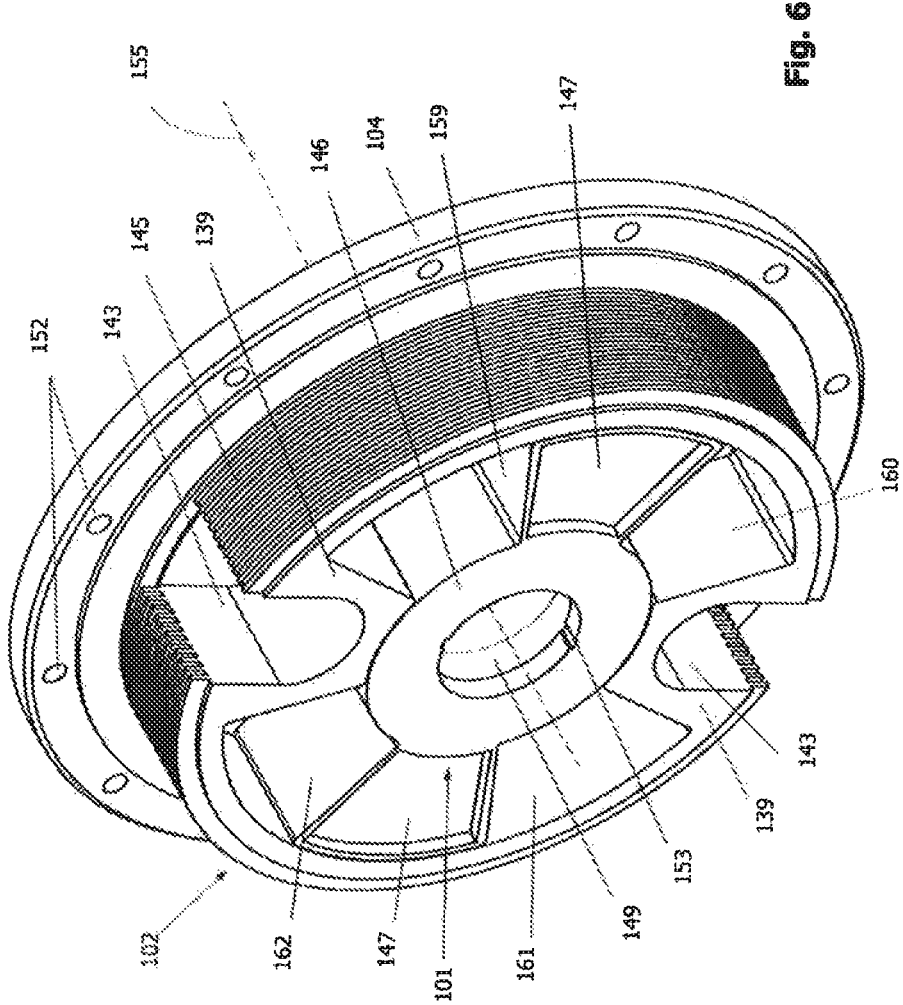

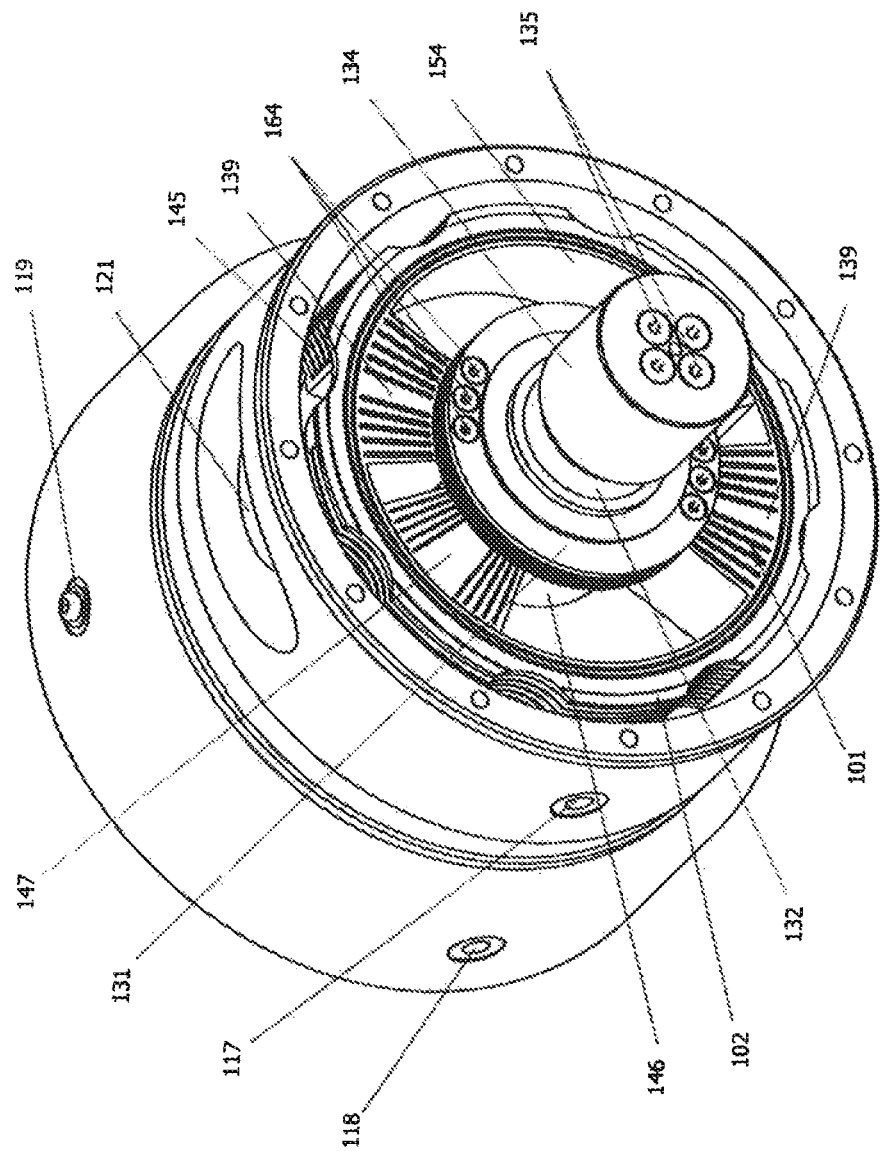

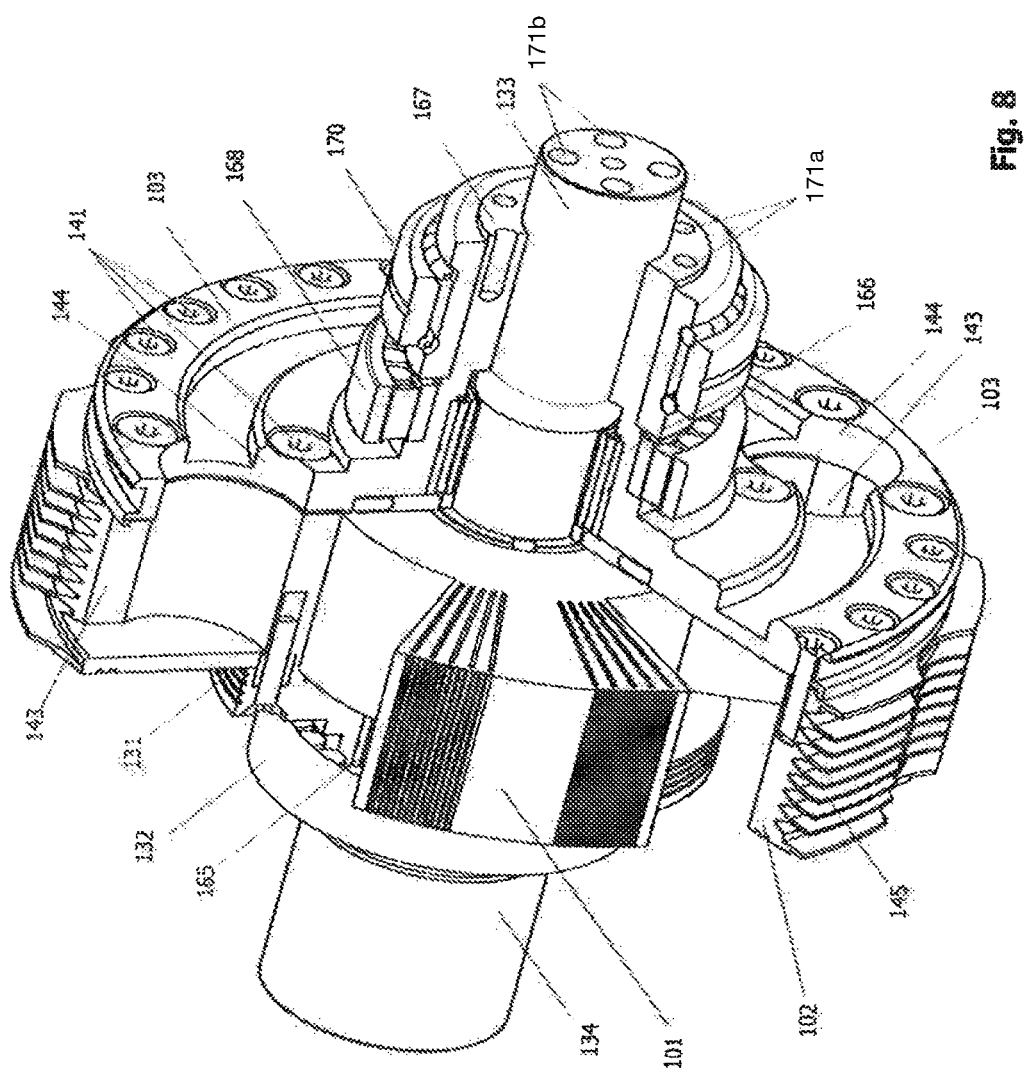

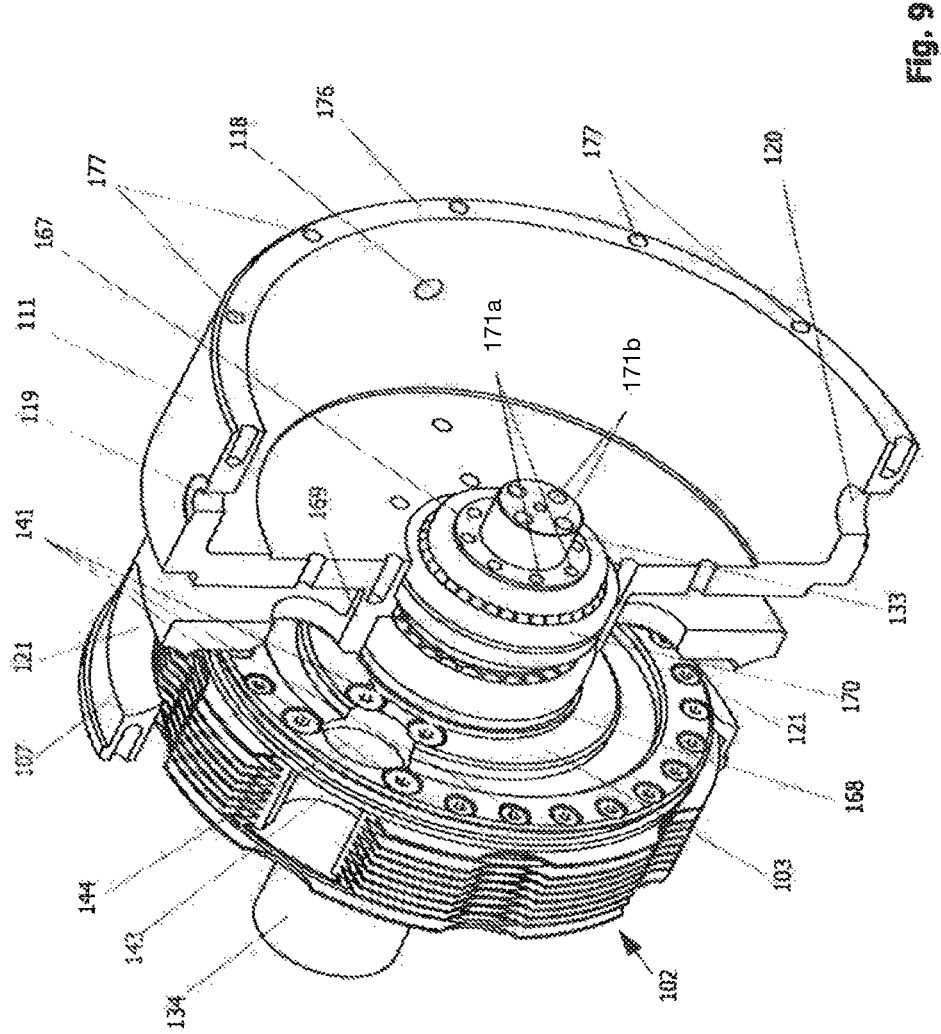

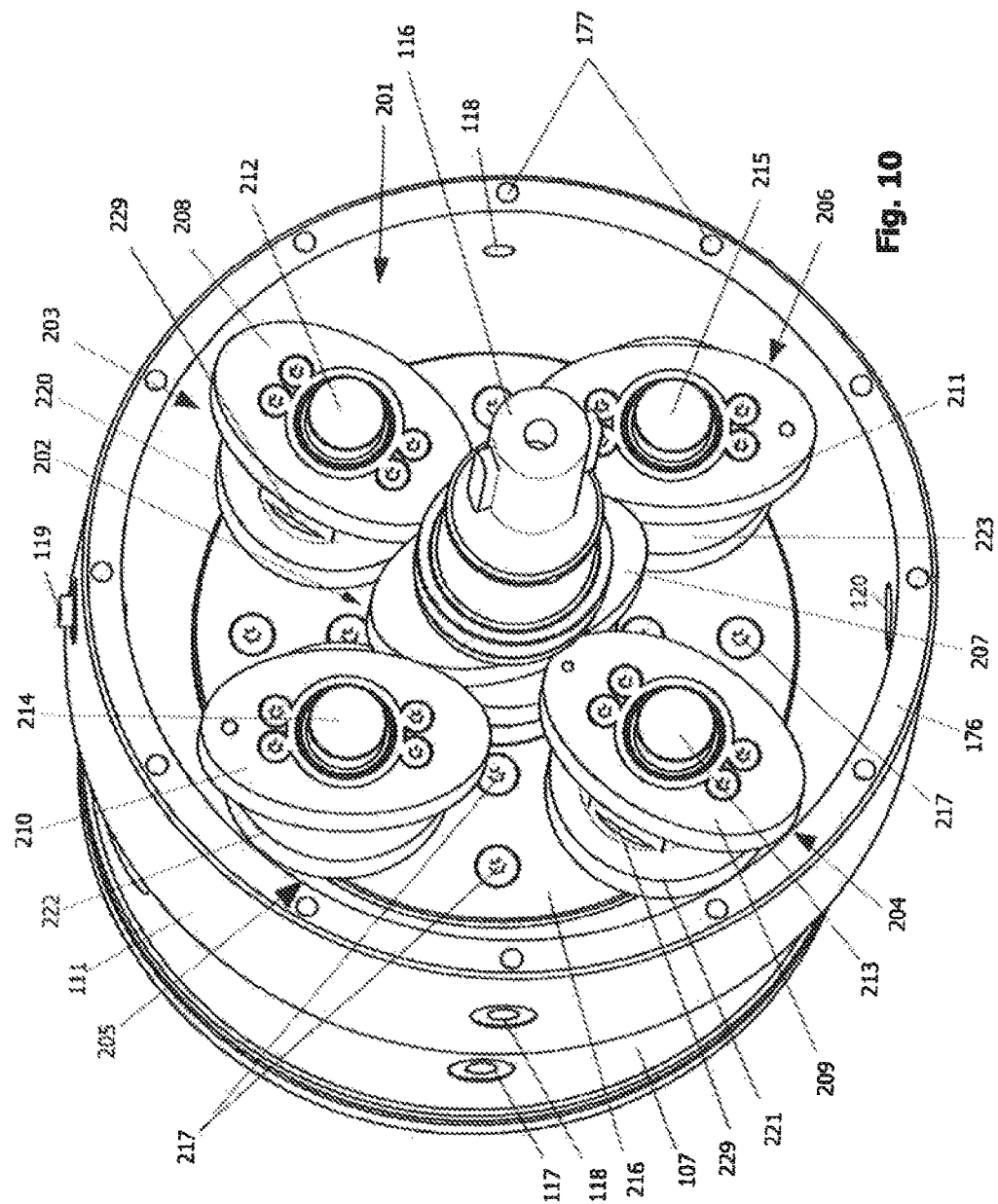

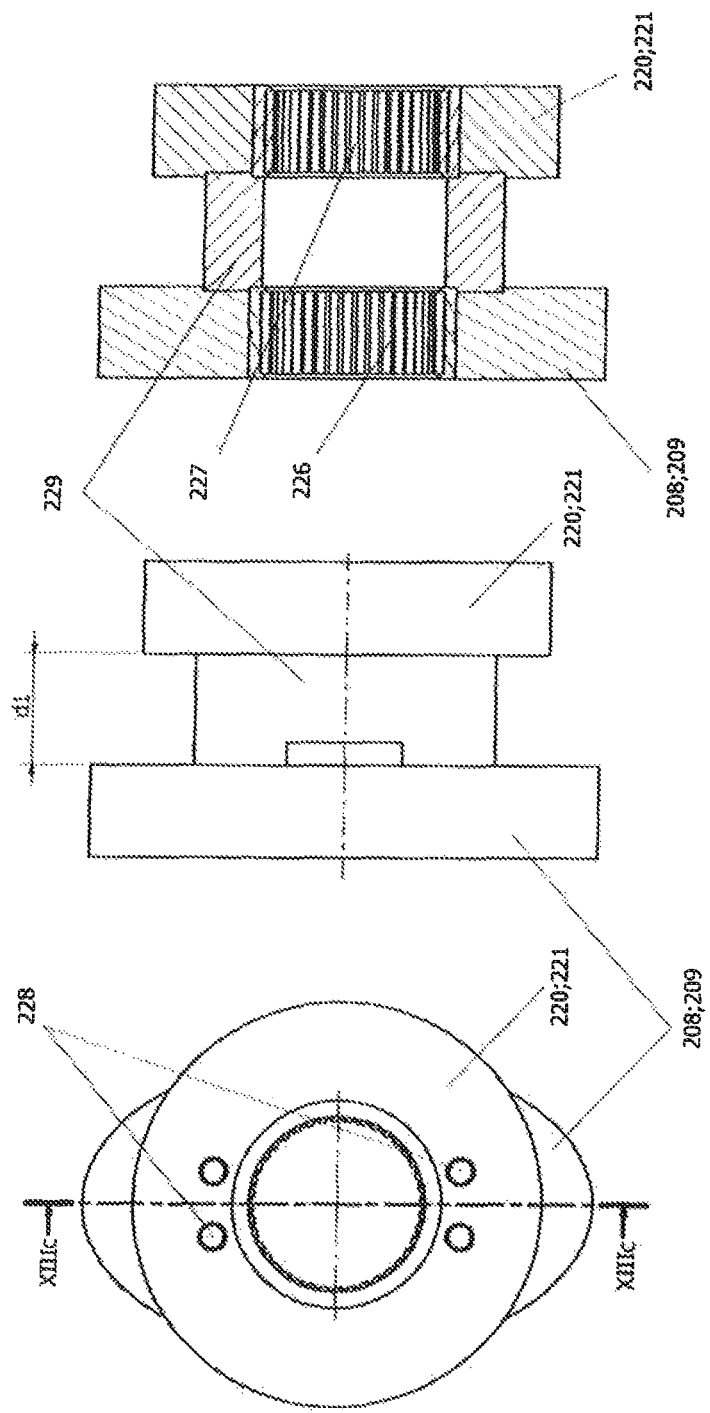

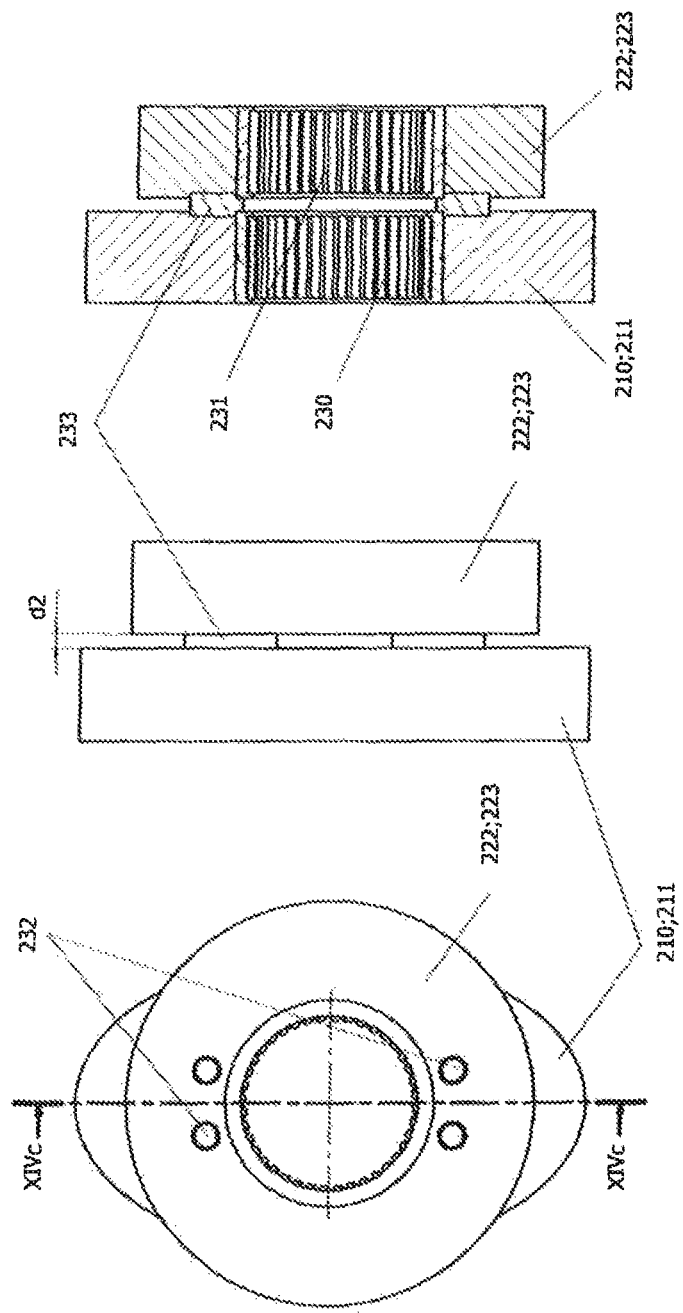

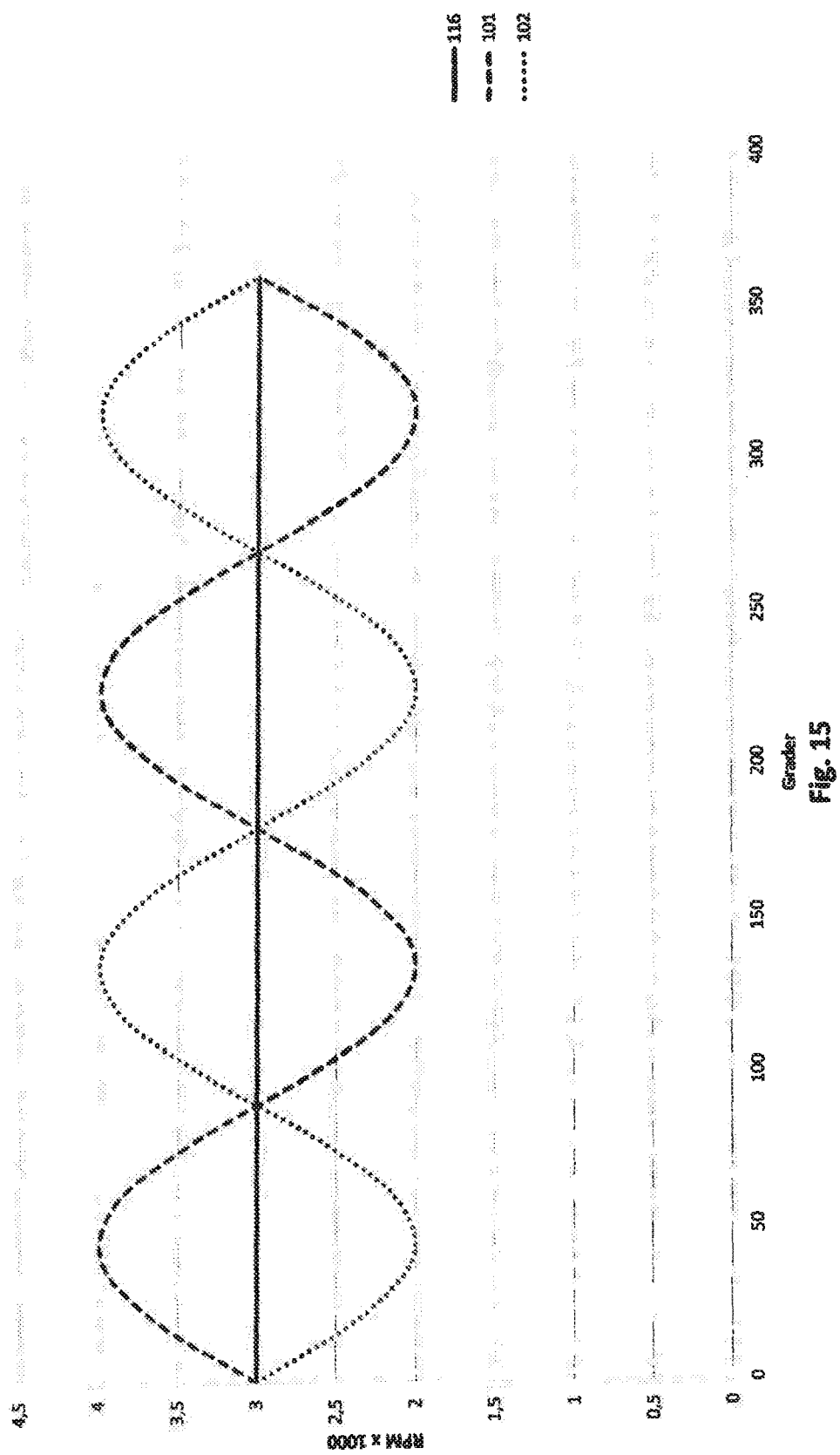

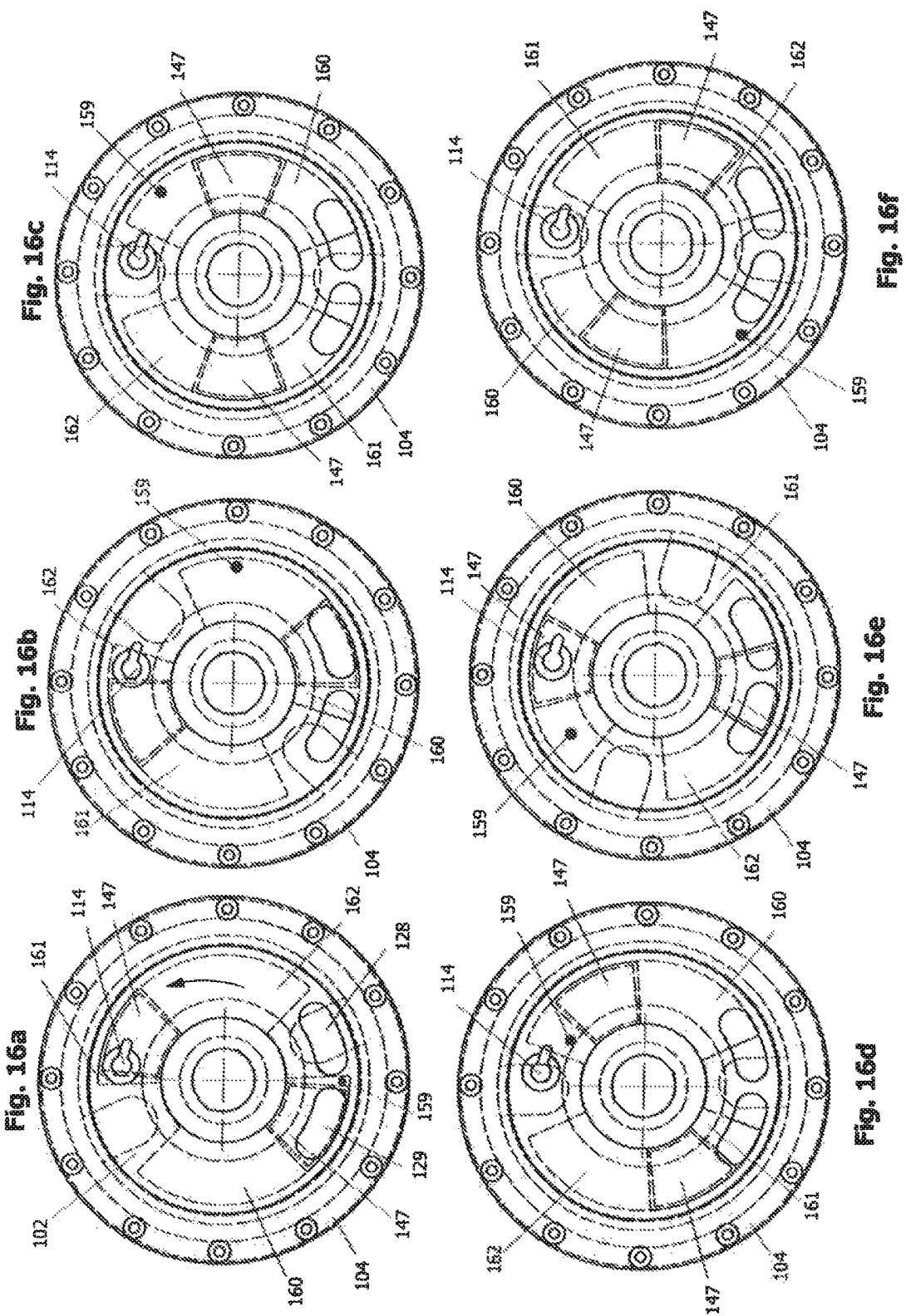

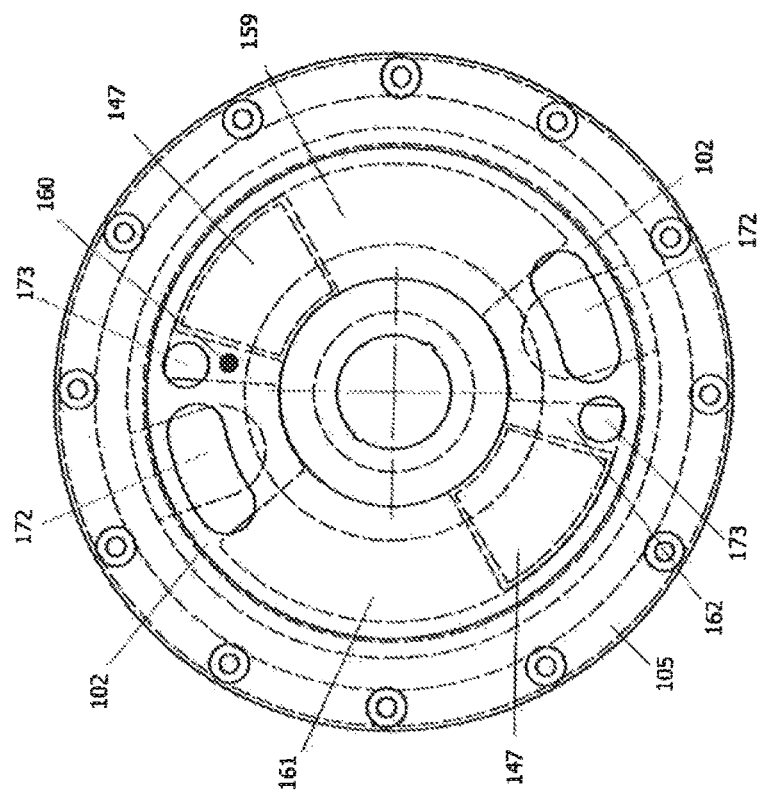
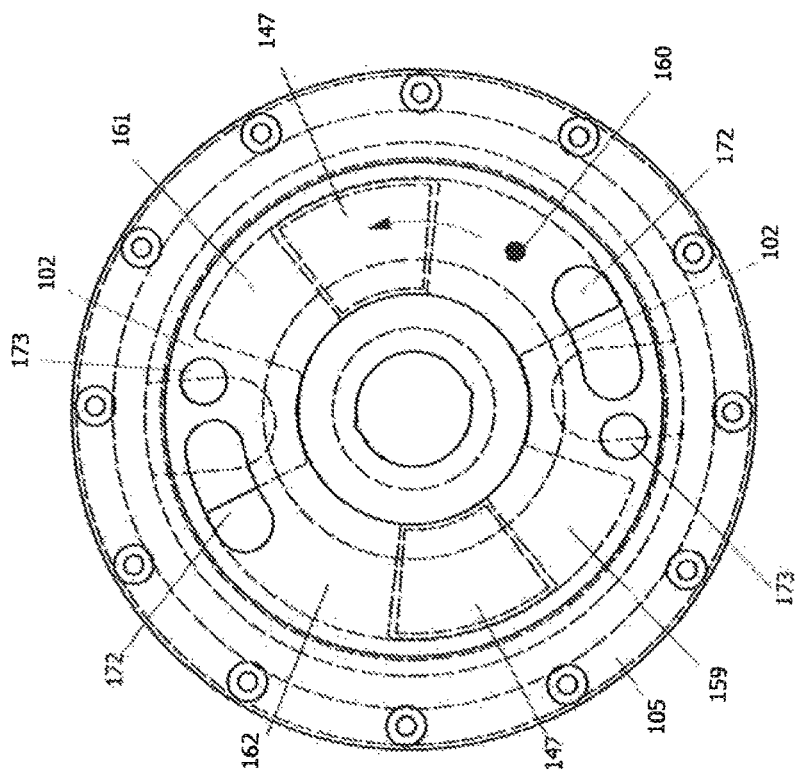

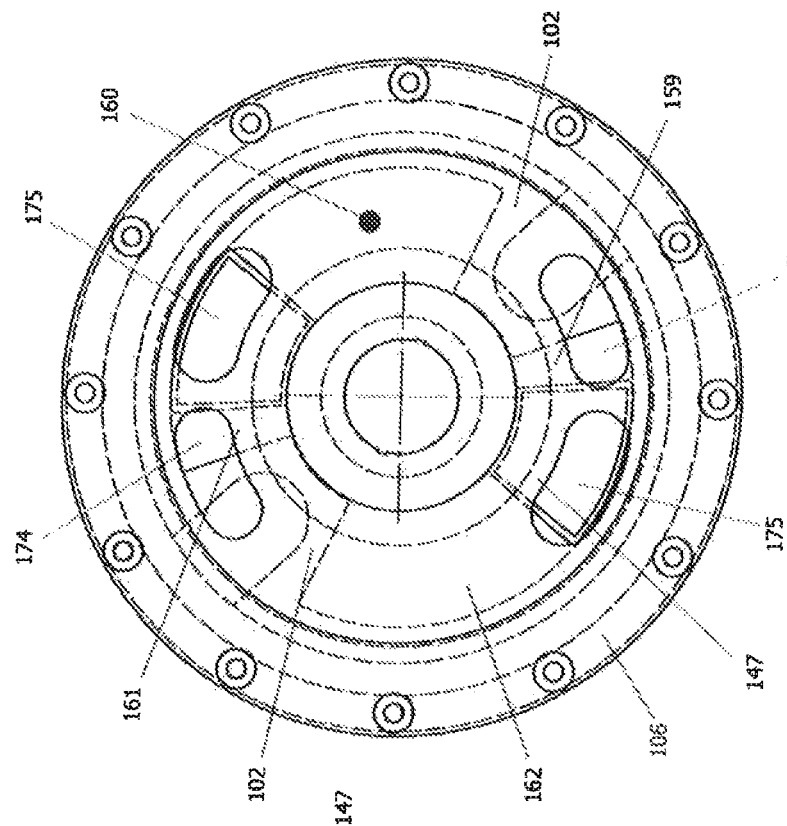
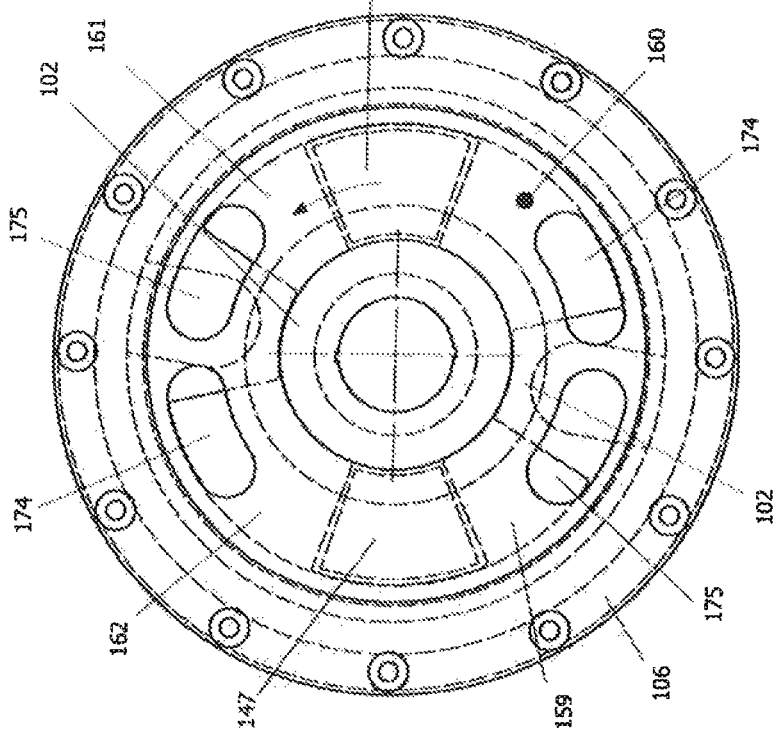

DISPLACEMENT TYPE ROTARY MACHINE WITH CONTROLLING GEARS

BACKGROUND OF THE INVENTION

The present invention relates to a device for a machine of displacement type, comprising: a) a non-rotatable housing which surrounds two mutually movable parts, b) a first part which with its outer circumference is controllably rotationally movable along inside wall of the housing, c) a second part which is controllably movable relative to inner circumferential face of the first part, and d) at least one inlet aperture and at least one outlet aperture associated with a wall of the housing.

Further, the invention relates, in a first aspect, to a controlling gear arrangement to cause continuous, mutually variable movement of a first part and a second part which are co-axial, and wherein the first and second parts are in operational co-operation with a main drive shaft, and in a second aspect relates to a controlling gear arrangement in operational co-operation with machine device to control two continuously rotating, mutually movable functional parts in the machine device, thereby causing continuous, mutually variable movement in the machine device of a first part and a second part which are co-axial, the first and second parts being in operational co-operation with a rotary main drive shaft which forms part of the controlling gear arrangement, the main drive shaft being in operational gearwheel coupling with a first rotary sub-drive shaft for the first part and with a second rotary sub-drive shaft for the second part, respectively, and the gearwheel coupling including therein co-operating elliptical gearwheels, and the rotary main drive shaft is equipped with a fixedly attached elliptical gearwheel, The invention relates also to a usage of such a controlling gear arrangement.

From the literature and as a product there is known a very large number of different types of displacement type machines, such as combustion engines, compressors and pumps. Such machines are, however, most often structured with two parallel or two eccentrically located axes of rotation.

Best known as combustion engine based on volumetric changes based on rotary geometries is the Wankel engine, and it is still being developed today. However, other internal combustion rotary engines based on geometrical volumetric changes have not found any commercial exploitation.

The known Wankel engine has only one rotor which rotates eccentrically in a stationary enclosing housing. In its first embodiments it was structured in such a way that what is the housing, in to-days well-known version, rotated about its own axis, implying that this first variant of the Wankel engine in reality appeared as a two-rotors engine.

However, the Wankel engine has not been a great commercial success, despite its capability of exhibiting high revolutions per time unit range and almost a vibration-less operation, small structural size and low weight. This is caused by substantial disadvantages such as relatively high manufacturing costs due to requirements related to fine polishing and coating of movement path of the inner circumference of the stator, significant sealing problems between stator and rotor, in particular towards the periphery. This is due to these sealing faces becoming extremely narrow, almost like a stripe, and where the angle of abutment is noticeably changed during rotation. Some of these problems have to a certain extent been solved from a technical view, but challenges related to geometry seem to be almost unsolvable. Inter alia, the combustion surface in the chambers between rotor and stator at the periphery becomes quite large, and the compression ratio is geometrically quite small. This results in the Wankel engine regrettably exhibiting low efficiency and a high fuel consumption.

In the literature and in numerous patent publications there are in addition found a substantial number of proposals related to machines having one or two rotors which exhibit eccentric axis of rotation.

The following patent publications are referred to as a representation of related prior art: US 2012/0080006-A1, U.S. Pat. No. 3,430,573-A1, US 2004/0187803-A1, WO 03/008764-A1, U.S. Pat. No. 5,622,149-A, GB 1021626-A, GB 1028098-A, U.S. Pat. No. 3,356,079-A and U.S. Pat. No. 3,112,062-A.

Pure displacement or expansion machines with rotary geometries appear most often as compressors for gases and to some extent as expansion machines for gases. Screw compressors with two parallel rotors and axes of rotation are to-day widely used, in particular for producing pressurized air. Within the field of expansion machines which convert pressure into mechanical power, there is present in particular lamellae based machines with an eccentric axis of rotation, and these are also used for tools powered by pressurized air.

Other structures of similar types appear as e.g. liquid pumps, being so-called displacement machines. Eccentric geometries are also often used in pumps, e.g. pumps for lubricants in car engines.

SUMMARY OF THE INVENTION

The invention has as an object to find a solution to the challenges and known problems related to both sealing and surface ratios during normal operation for devices of types mentioned in the introduction, such as e.g. combustion engines, as it is according to the invention intended to provide a machine which exhibits many of the advantages of a rotary machine, such as having compact and light-weight structure, being vibration-less as regard mass forces, and which exhibits a mechanically simple structure with a minimum of movable parts, simultaneously with selection of required compression ratio being present.

According to the invention, the initially mentioned machine is characterized in:

e) that the two mutually movable parts have co-axial axes of rotation, f) that the first part internally has at least two radially, inwardly directed wings with arranged mutual angular distance along the curved inside wall of the part between the wings, g) that the second part has a hub which has at least two radially, outwardly directed wings with mutual angular distance, h) that portion of the hub between the wings of the second part is in slidable or adjacent contact with a curved, free end portion of the wings on the first part, i) that a curved, free end portion of each wing on the other part is in slidable or adjacent contact with the curved inside wall on the first part which is located between respective ones of two neighbouring of the wings on the first part, j) that the first part and the second part are both continuously rotatably movable, but with mutually variable movement, the wings of the second part being movable between respective neighbouring wings on the first part, so that chambers which are created between co-operative pairs of wings on the first part and the second part successively increase and decrease, and decrease and increase, respectively, in volume during the course of a rotation cycle of the created chambers, k) that one first axial end of the two parts is in slidable or adjacent contact with a first cover having apertures for controlled communication with the chambers, the first cover constituting the wall, and that a second axial end of the two parts is covered by a second cover which is attached to the first part and rotary therewith, and the second part being in slidable or adjacent contact with the second cover, and l) that movements of the mutually movable parts are caused by a controlling gear arrangement which operationally co-operates with a rotatable main drive shaft of the machine.

According to an embodiment, the rotary main drive shaft co-acting with the controlling gear arrangement is operational gearwheel coupling with a first, rotary sub-drive shaft for the first part and with a second, rotary sub-drive shaft for the second part, respectively, co-operating, elliptical gearwheels being incorporated in the respective gearwheel coupling.

Further, the main drive shaft and the first and second sub-drive shafts are co-axial.

Further embodiments of the device, according to the invention, appear from the —related claims.

According to the first aspect, the controlling gear arrangement mentioned in the introduction is characterised, according to the invention, in that the rotary main drive shaft, which forms part of the controlling gear arrangement, is in operational gearwheel coupling with a first, rotary sub-drive shaft for the first part and with a second, rotary sub-drive shaft for the second part, respectively, co-operative elliptical gearwheels being included in the respective gearwheel coupling, and wherein the main drive shaft and the first and second sub-drive shafts are co-axial.

Further embodiments of first aspect of the controlling gear arrangement appear from —related claims.

According to the second aspect of the controlling gear arrangement mentioned in the introduction, the arrangement is characterised in:

the main drive shaft and the first and second sub-drive shafts being co-axial, at least one first co-axial set of a rotary, elliptical gearwheel and a rotary, circular gearwheel which are fixedly interconnected with a first mutual axial distance, a rotation axis of the gearwheels being parallel to a rotation axis of the main drive shaft, the elliptical gear wheel of the first set forming gearwheel engagement with the elliptical gearwheel which is rigidly attached on the main drive shaft, and the circular gearwheel of the first set forming gearwheel engagement with a circular gearwheel on a sub-drive shaft for the first part for rotation thereof, and at least one second co-axial set of a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of the second set forming gearwheel engagement with the elliptical gearwheel which is rigidly attached on the main drive shaft, and the circular gearwheel of the second set forming gearwheel engagement with a circular gearwheel on a sub-drive shaft for the second part for rotation thereof.

Further embodiments of second aspect of the controlling gear arrangement appear from —related claims.

The usage of the controlling gear arrangement is to control two continuously rotating, mutually movable functional parts of a machine device in order in an operation cycle of the machine device to develop successive displacement varying suction-, compression- and ejection chambers in the machine device when it is a combustion engine or a compressor, or to successively develop varying displacement spaces in the machine device when it is a pump.

The invention is now to be explained more closely with reference to the attached drawings which illustrate a currently preferred, relative to the invention, non-limiting embodiment of the respective parts of the device and the controlling gear arrangement.

BRIEF DESCRIPTION OF THE DRAWINGS

FIGS. 3a and 3b show in perspective views from the front and the rear, respectively, a first part of two mutually movable parts of the device, where the first part is in the form of an outer rotor.

FIG. 4 shows in perspective view a second part of two mutually movable parts of the device, where the second part is in the form of an inner rotor.

FIG. 5 shows an enlarged detailed section V of FIG. 4.

FIG. 6 shows a sketch of the two mutually movable parts joined, as seen from the side of the first part as shown on FIG. 3b.

FIG. 7 is a perspective view of a part of the device with the mutually movable parts and with the front cover removed for sake of clarity.

FIG. 8 is a perspective view of a part of the device with the two mutually movable parts, with the front cover removed for sake of clarity, and portions of the non-rotatable housing for the parts cut away.

FIG. 9 is a perspective view of a part of the device which includes the two mutually movable parts, but without controlling gear arrangement included therein for sake of clarity, and with a half of the non-rotary housing for the mutually movable, rotary parts and a half of the non-rotary housing for the controlling gear arrangement cut away.

FIG. 10 is a perspective view of the controlling gear arrangement, according to the invention.

FIGS. 13a, 13b and 13c illustrate a first type of gearwheel set for use in the controlling gear arrangement, as seen in planar view, side view and in the section XIIIc-XIIIc, respectively.

FIGS. 14a, 14b and 14c illustrate a second type of gearwheel set for use in the controlling gear arrangement, as seen in planar view, side view and in the section XIVc-XIVc, respectively FIG. 15 shows relative curves for number of revolutions per unit of time for the two mutually movable parts relative to a uniform number of revolutions per unit of time for the machine drive shaft.

FIGS. 16a-16f illustrate positions of the two mutually movable parts at six different positions of a duty cycle of the device, related to an engine with a front cover adapted to engine mode of operation.

FIGS. 17a-17b illustrate positions of the two mutually movable parts at six different positions of a duty cycle of the device, related to a compressor with a front cover adapted to compressor mode of operation.

FIGS. 18a-18b illustrate positions of the two mutually movable parts at six different positions of a duty cycle of the device, related to a pump with a front cover adapted to pump mode of operation.

DETAILED DESCRIPTION OF THE PREFERRED EMBODIMENTS

Figure 1:
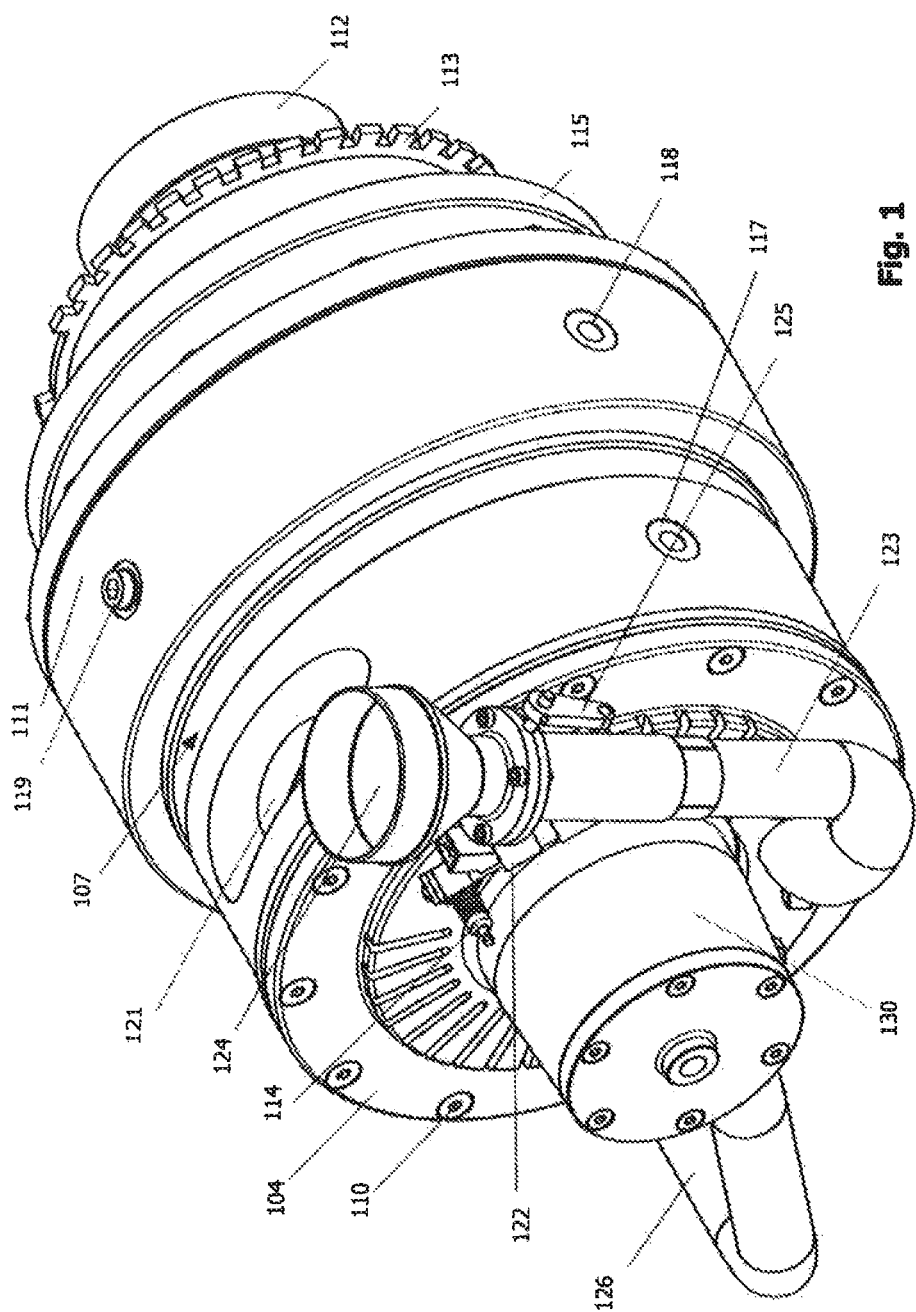
FIG. 1 shows in perspective view a main drawing of the machine device, according to the invention, in an engine variant.

In connection with the following description, it should be pointed out that as an outset the way of operation of the two mutually movable parts, denoted as inner rotor 101 and outer rotor 102, respectively (see in particular FIGS. 3a, 3b, 4, 5, 6 and 7), as well as the controlling gear arrangement 201 (or controlling gears) is the same, irrespective of the device being used for engine operation, compressor operation or pump operation, even though there is provided respective and different front covers 104 (FIGS. 1, 2 and FIGS. 16a-16f), 105 (FIGS. 17a-17b) and 106 (FIGS. 18a-18b) for the respective fields of use, as will be explained later in connection with the respective function cycles. The variable chambers formed by the rotation of the inner rotor 101 and the outer rotor 102 are limited in axial direction by the front cover 104 (alternatively the front cover 105 or 106) and a rear cover 103, as shown on FIGS. 2, 8, 9, 11 and 12. The rear cover 103 is fixedly bolted to the circumference of the outer rotor, as will be further explained in connection with FIG. 3b.

On FIG. 1 there is shown an embodiment of the device, according to the invention, configured for engine function.

It is thereon shown a housing 107 having a circular wall 108, a first end wall 109 and a second end wall 104 formed by the front cover 104 (front cover 105 or 106 if compressor function or pump function, respectively). The walls 108 and 109 are preferably integrally cast. The end wall or the cover 104 (alternatively the cover 105 or 106 which also can form an end wall) is preferably attached to the wall 108 using a plurality of attachment bolts 110, such as shown on FIGS. 1 and 2.

In FIG. 1 there is in addition shown a housing 111 for the controlling gear arrangement, coupling 112 for any test bench brake, toothed disc 113 for ignition indicator related to an ignition device 114, e.g. a spark plug, which can be screwed into the end wall 104. Further, there is shown on FIG. 1 a flywheel 115 which is attachable onto a main drive shaft 116 (see inter alia FIG. 2) in a manner known per se. The flywheel is therefore for sake of simplicity not shown on any of the other drawing figures. The coupling 112 and the disc 113 can 10 suitably also be attached onto the shaft 116 or be attached thereto via the flywheel 115. The housings 107 and 111 are each provided with machine suspensions 117, 118, respectively. Corresponding machine suspensions may of course also be provided on diametrically opposite side of the respective housing 107, 111. The housings 107, 111 can e.g. consist of four inter-connectable parts, but in a practical embodiment they can each consist of two halves, where one half of one housing is integrally cast with a half of the other housing, in such a way that the housings 107 and 111 consist of two integrally cast parts which may then be joined. As an alternative, the housing 107 (i.e. the walls 108 and 109 thereof) and the housing 11/1 can be cast as only one item. This latter alternative is the currently preferred embodiment.

At the top of the housing 111 there is located an oil filling nozzle stub 119 for the controlling gear arrangement 201 which is located inside the housing, and which is to be described in detail later. At the bottom of the housing 111 there may be located an oil drain hole 120. Filling of oil may e.g. take place through injection of an oil mist, so that the interior of the housing is not filled completely with oil, and the oil can be drained out through the hole 120, be strained and be cooled before re-injection via the nozzle stub 119.

There is on the housing 107 shown at least one aperture 121 for blow-out of cooling air from the inside of the housing.

Further, there is on FIG. 1 shown an injection nozzle 122 for fuel, an air suction manifold 123 having at the top thereof an attachment 124 for an air filter, a speed handle 125, and an exhaust manifold 126.

Figure 2:
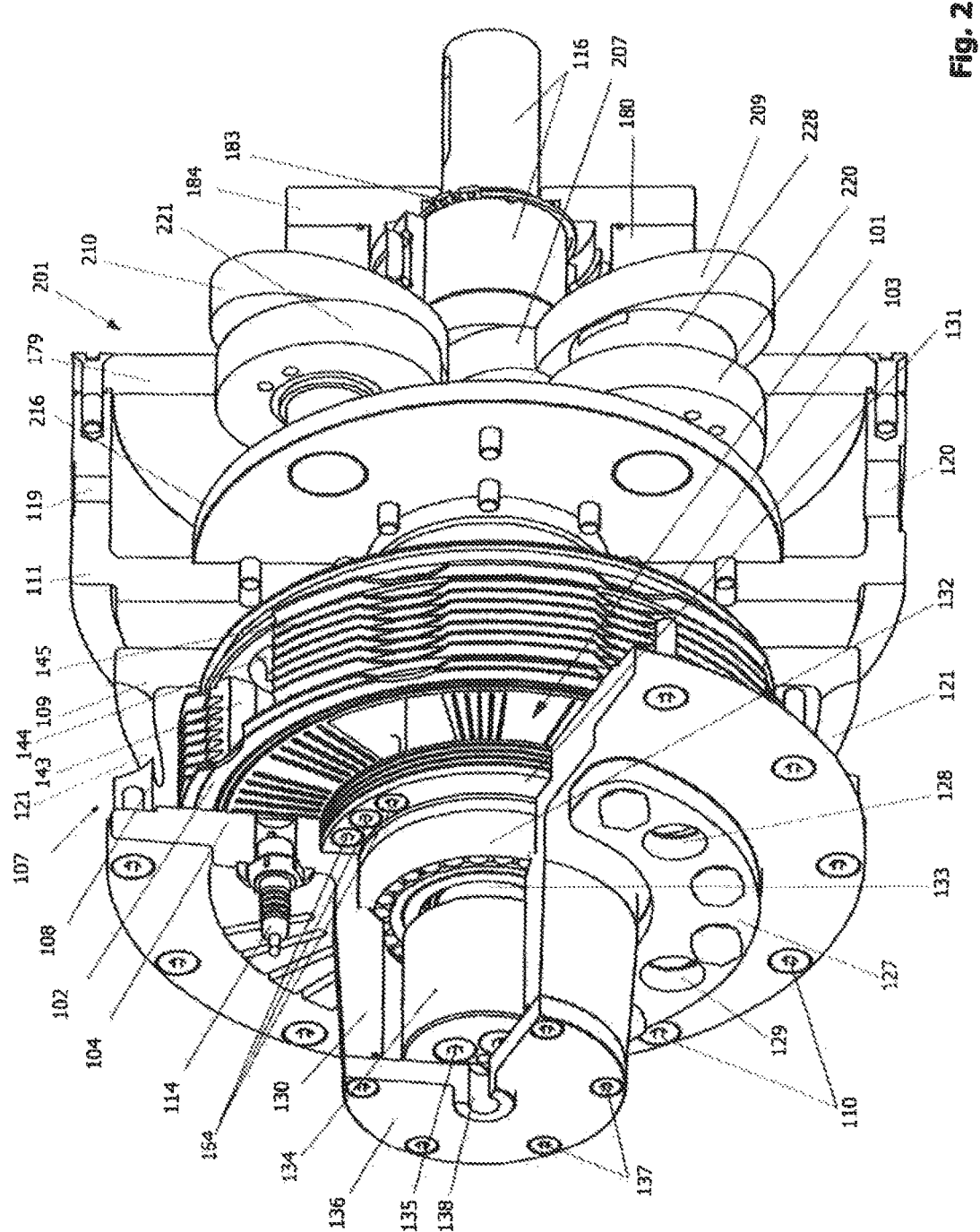
FIG. 2 shows in another perspective view the embodiment of FIG. 1 with machine covers partly cut away.
Figure 11:
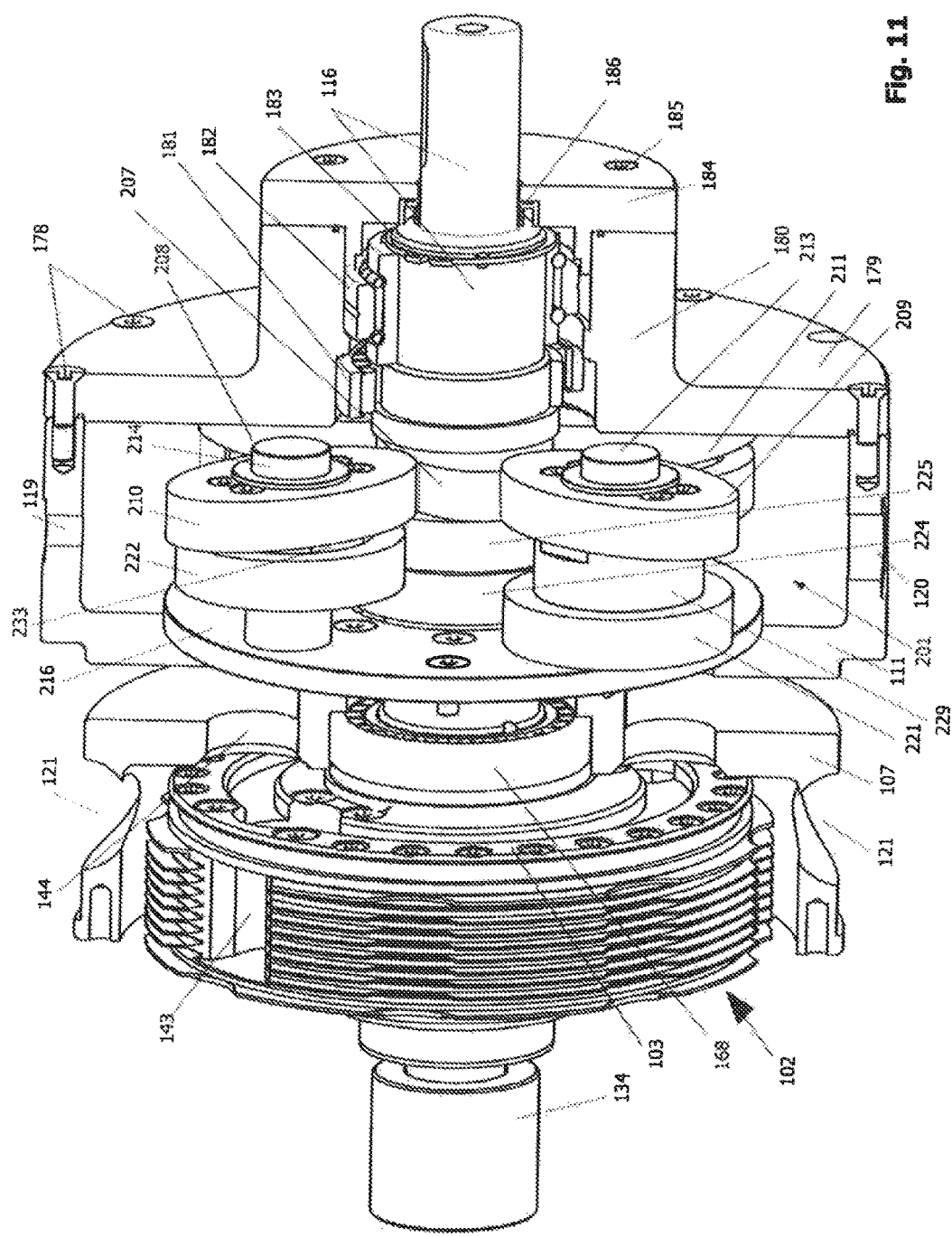
FIG. 11 shows the device with the two mutually movable parts and with their surrounding housing partly cut away, as well as the controlling gear arrangement and its surrounding housing partly cut away for sake of clarity.

As shown on FIG. 2 there is on the outside of the wall 104 a bracket 127 for attachment of the suction manifold 123 and the exhaust manifold 126 to respective suction aperture 128 and exhaust outlet aperture 129 from inside of the housing 107, i.e., from the combustion chambers formed by means of the rotors 101 and 102 and the end walls 104, 109.

It will be noted that the wall or cover 104 is integrally connected with a protruding wall portion in the form of a front bushing or front cover 130. The wall 104 surrounds a front shaft 131 for the outer rotor 102, and the front bushing 130 surrounds and clamps a roller bearing 132 for the front shaft 131 of the outer rotor 102. Further, the front bushing 130 surrounds a shaft 133 for the inner rotor 101. A compensator 134 for mass inertia is attached by means of bolts 135 to the shaft 133 of the inner rotor. The front bushing 130 is terminated by a front end lid 136 which is attached to the front bushing 130 by means of bolts 137. An inlet 138 for cooling- and lubrication oil is suitably located in the front end lid 136. However, it is also possible to visualize such an inlet placed instead in the front bushing 130.

FIG. 3 illustrates the outer rotor 102 in further detail. It has, in the shown embodiment, two radially, inwardly directed, diametrically located wings 137. The number of wings may possibly be increased, provided that the number of wings on the inner rotor is increased correspondingly. It may, however, require diametrical dimension increases of the machine. An alternative could instead be to axially connect in parallel multiple units of the housing 107 and the rotors 101, 102, or possibly increase their axial dimensions.

The wings 139 are provided with a plurality of pressure drop grooves 140. The advantage of such pressure drop grooves is the avoidance of sealing springs to slide along a wall and which require well controlled lubrication, and which as regards wear is a serious problem related to inter alia an engine type like the Wankel engine.

As indicated above, and as shown on FIGS. 8 and 9, the rear cover 103 is attached to the rear side of the outer rotor 102 by using a large number of bolts 141 which are attached in corresponding attachment holes 142 (FIG. 3b) in the outer rotor 102. The outer rotor 102 is in addition provided with cooling creative recesses 143 from outer circumference and inwardly in the wings 139, so that the wings in reality will not be solid, but hollow. The recesses 143 co-operate with corresponding holes 144 (FIG. 8) in the rear cover 103, in order that cooling air may circulate via the holes and via the recesses 143 in the wings 139 and can pass over cooling ribs 145 which are located along the outer circumference of the outer rotor 102, where blowing out of cooling air can take place via the blowout aperture 121.

The inner rotor 101 is shown in further detail on FIGS. 4 and 5. It has a hub 146 and diametrically located wings 147. The wings 147 are, as shown for the wings 139 of the outer rotor 102, also provided with pressure drop grooves 148 with technical advantages as discussed for the grooves 140. The hub 146 is advantageously also provided with an oil cooling space 149 for the inner rotor. Details of the pressure drop grooves 148 are shown on FIG. 5 illustrating section V of FIG. 4. The pressure drop grooves 140 on the outer rotor 102 are advantageously configured in a similar manner. The pressure drop grooves 150 which are located on the curved part of the wing 147 are preferably positioned mutually more closely than the grooves 151 located on the radial portion of the wings 147.

FIG. 6 shows an "idealized" view of how the inner and outer rotors are joined, and details related to cooling ribs and installation holes on the outer rotor are not included for sake of simplicity, and nor is the front bushing 130 visible. The holes 152 are to co-operate with the bolts 110, the bolts being fixedly inserted into corresponding holes (not shown) in the circular, annular part 108 of the housing 107. Wedge tracks 153 are located in the hub in order to provide for attachment to drive shaft 133 associated with the inner rotor 101. This drive shaft will be described further later on.

In summary, related to the definition of the invention associated with the two mutually movable parts, there is thus present a device related to a machine comprising a non-rotary housing 107, i.e. with wall portions 104, 108, 109, 130; 105, 108, 109, 130; 106, 108, 109, 130 surrounding the two mutually movable parts 101, 102. A first part 102, which forms the outer rotor is with its outer circumference controllably rotation-movable along an inside wall face, i.e. the cover 104 of the housing. The other part, i.e. the inner rotor 101 is controllably movable relative to inner, curved circumferential face 150, i.e. wall portion, of the outer part 102. As shown on FIG. 1 at least one inlet manifold 123 and at least one outlet manifold 126 are located on and associated with the wall 104, i.e. the front cover of the housing 107.

As clearly appearing from inter alia FIG. 6, the two mutually movable parts, i.e. the rotors, 101 and 102, have co-axial rotary axes, i.e. the indicated axis 155. The rotor 102 has, as previously explained, internally at least two radially inwardly directed wings 139 with mutual angular distance along the rotor curved inside wall 154 (see FIGS. 3a and 3b) between the wings 139. In the illustrated example, the angular distance between radial mid-region of the two wings 139 being 180°, i.e. the wings 139 being located diagonally opposite each other. The inner rotor 101 has the hub 146 with the at least two radially outwardly directed wings 147 with mutual angular distance between radial mid-region of the two wings 147 being 180°, i.e. the wings 147 being located diagonally opposite each other. The portion 156 on the hub 146 is curved and is in slidable or adjacent contact with a curved, free end portion 157 of the wings 139.

A curved, free end portion 158 of each wing 147 on the inner rotor 101 is in slidable or adjacent contact with the curved, inside wall portion 154 on the outer rotor 102 which is to located there between two neighbouring wings 139.

The term "curved" in connection with the two preceding paragraphs is interpreted as e.g. circular arc segment shaped.

The rotors 101, 102 are both continuously rotationally movable, but with mutually variable movement, the wings 147 of the inner rotor 101 being movable between the respective, neighbouring and diametrically located wings 139 on the outer rotor 102, so that chambers 159, 160 and 161, 162 which appear between co-operating pairs 139, 147 of wings on the outer rotor 102 and the inner rotor 101 successively increase and decrease, and decrease and increase, respectively, in volume in the course of a rotation cycle for the created chambers.

A first axial end of the two parts 101, 102 is in slidable or adjacent contact with the first cover, i.e. the front cover 104 with apertures 128 and 129, possibly via the bracket 127, for controlled communication with the chambers, the first cover 104 constituting the wall. A second end of the two rotors 101, 102 is covered by the second cover 103 which is attached to the outer rotor 102, as previously explained, and which is thereby rotary therewith. This implies thereby that the first rotor 101 becomes in slidable or adjacent contact with the second cover 103 when the rotor 101 rotates.

Movements of the two mutually movable rotors 101, 102 are influenced by a controlling arrangement 201 which operationally includes the rotary main drive shaft 116 for the machine.

It will be noted from FIG. 3a that the wings 139 have three holes 163. These holes are used for attaching the front shaft 131 for the outer rotor to these wings 139 by means of bolts 164 (see FIG. 7), and where the roller bearing 132 co-operates with the front shaft 131 of the outer rotor.

The shaft 133 for the inner rotor 101 can be attached to the hub 146 of the inner rotor via the wedge tracks 153 in a manner known per se. The shaft 133 is also visible on FIG. 2 and also on FIGS. 8 and 9.

As seen from FIG. 8 there is advantageously present a needle bearing 165 for the inner rotor 101. This needle bearing is not visible on the other drawing figures, but the inner shaft 133 has also a further needle bearing 166 located between the shaft 133 and the cover 103. The cover 103 constitutes in its axial extension a drive shaft 167 for the outer rotor 102. A roller bearing 168 for the shaft 167 of the outer rotor 102 is located with its outer circumference clamped into a flange 169 on the housing 111 (see FIG. 9). A thrust bearing 170 for the drive shaft 167 of the outer rotor is clamped between the shaft 167 and the housing 111 (see FIG. 9).

Holes 171a and 171b shown on FIG. 8 are screw attachments for connection of the shaft 167 of the outer rotor and the shaft 133 of the inner rotor, respectively, to the structural elements of the controlling gear arrangement 201, as will be explained more closely.

As shown with particular reference to FIGS. 10-14 the rotary main drive shaft 116, which also forms part of the controlling gear arrangement 201, is operationally co-operative via gearwheel couplings 202, 203; 202, 204 with a first rotary sub-drive shaft, i.e. the rotor shaft 167 for the outer rotor 102, as well as operationally co-operative via gearwheel couplings 202, 205; 202, 206 with a second rotary sub-drive shaft, i.e. the rotor shaft 133 for the inner rotor 101, and wherein co-operative, elliptical gearwheels 207-211 are included in the respective gearwheel coupling.

The elliptical gearwheel 207 is located on the main drive shaft 116 and is common to all gearwheel couplings 202, 203; 202, 204; 202, 205; 202, 206. The gearwheels in the parts 203; 204; 205; 206 of the respective gearwheel couplings are installed rotatable on a respective shafts 212; 213; 214; 215, and these shafts are installed onto an attachment plate 216 which is fixedly bolted to the housing 111 via holes 217 in the plate 216 and attachment holes 219 in the housing 111. Short attachment bolts 218 can pass through the attachment holes 219 in the plate 216. Circular gearwheels 220; 221; 222; 223 are also included in the parts 203; 204; 205;

206. The gear wheels 220, 221 are in gearwheel engagement with a circular gearwheel 224 which constitutes connection to the shaft 167 for the outer rotor 102. The gear wheels 222, 223 are in gearwheel engagement with a circular gearwheel 225 which constitutes connection to the shaft 133 for the inner rotor 101.

The set of gearwheels being included in the parts 203; 204 has been shown in more detail on FIG. 13, from which is seen that the elliptical gearwheel 208; 209 is axially separate from, but rigidly connected with the circular gearwheel 220; 221 by a distance d1. Bearings 226; 227 are arranged inside the elliptical gearwheel 208; 209 and on the circular gearwheel 220; 221 in order to arrange these to be rotatable on the shaft 212; 213. Bolts 228 rigidly interconnect the gearwheels 208, 220 and 209, 221 with an intermediate piece 229. The distance d1 is somewhat larger than the thickness of the gearwheel 225, e.g. approximately 10-25% larger—even though this is only to consider as a non-limiting proposal. The distance d1 is present in order that the gearwheels 210, 222 and 211, 223 in a reliable manner may form a respective gearwheel engagement with the gear wheels 223, 224.

The set of gearwheels being included in the parts 205; 206 have been shown in more detail on FIG. 14, from which is seen that the elliptical gearwheel 210; 211 is axially separate from, but rigidly connected with the circular gearwheel 222; 223 by a distance d2, the distance d2—in a non-limiting example—being e.g. 10-25% of d1. Bearings 230; 231 are arranged inside the elliptical gearwheel 210; 211 and on the circular gearwheel 222; 223 in order to arrange these to be rotatable on the respective shaft 214; 215. Bolts 232 rigidly interconnect the gearwheels 210, 222 and 211, 223 with an intermediate piece 233. The distance d2 enables the gearwheel 225 to pass unobstructed with its outer circumference in this d2 —dimensioned interspace.

Even though there is shown one first pair of same parts 203, 204 and a second pair of same parts 205, 206, it will be appreciated that it will be possible to use only one of the parts of each pair, e.g. the parts 203 and 205. By using only one of the parts of each pair, this may yield a limitation to maximum transfer of momentum (torque) if strength specifications are not improved. In a practical, currently preferred embodiment, there is used pairs of parts 203, 204 and 205, 206.

The composition of sets of gearwheels just shown and described is the currently preferred one.

Transfer of power from the engine, where the rotors 102, 101 co-operate via respective shafts 103', 131, to the output shaft 116 thus takes place via respective sets of gearwheel connections (where C=circular gearwheel and E=elliptical gearwheel).

Quite schematically the power transfers are:
167→224C→220C+208E→4207E→116
167→224C→221C+209E→207E→116
133→225C→222C+210E→207E→116
133→225C→223C+211E→207E→116

In this embodiment there are 6 circular gearwheels and 5 elliptical gearwheels.

A technical equivalent, which due to practical reasons is not shown on the drawings, as it is currently not the preferred embodiment, could be structured as follows (where C=circular gearwheel and E=elliptical gearwheel):
167→224E→220E+208C→207C→116
167→224E→221E+209C→207C→116
133→225E→222E+210C→207C→116
133→225E→223E+211C→207C→216

In this embodiment there are 6 elliptical gearwheels and 5 circular gearwheels.

This technical equivalent would then imply that the circular gearwheels 224, 225 on the shafts 167, 133 are made elliptical, that the circular gearwheels 220, 221, 222, 223 are made elliptical, that the elliptical gearwheels 208, 209, 210, 211 are made circular, and that the common elliptical gearwheel 207 is made circular. Initial mutual angular positioning of the elliptical gearwheels must be like that of the currently preferred embodiment, so that the operative co-operation between the rotors becomes correct.

If the machine device operates as a compressor or pump, i.e. with external driving power applied to the drive shaft 116, the direction of arrows in the two presentations above will be in the opposite direction.

Figure 12:
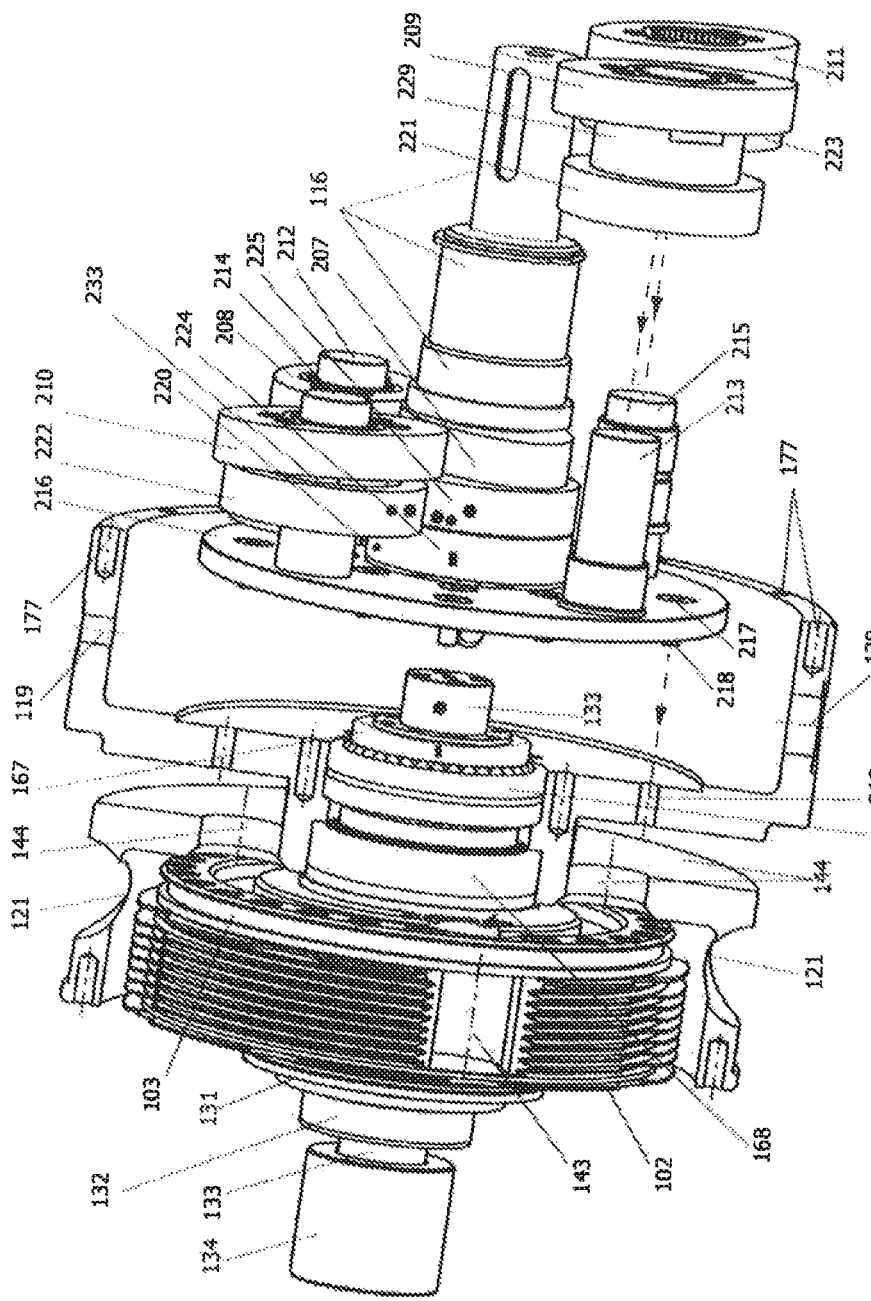
FIG. 12 shows the device as shown on FIG. 10 with the controlling gear arrangement shown in a partly exploded view.

It is in particular seen from FIG. 12 that the main drive shaft 116, and the drive shafts 167, 133 are co-axial (axis 155).

The elliptical gearwheels in the gearwheel set parts 203, 204, 205 and 206 are preferably of the same configuration, and the circular gearwheels in the gear wheel set parts 203, 204, 205 and 206 have preferably the same configuration.

It will be appreciated that the controlling gear arrangement 201, in its currently preferred embodiment, exhibits a continuous rotary movement which controls a mutually varying movement of the outer rotor and the inner rotor, the rotational pattern of the movements of these parts being a function of the ratio between the largest and smallest diameter of the elliptical gearwheels 208-211 and largest and smallest diameter of the elliptical gearwheel on the main drive shaft 116.

In the alternative, technically equivalent embodiment (not shown) of the controlling gear arrangement 201 it will correspondingly be the ratio between the largest and the smallest diameter on the elliptical gearwheels 220-225 which will be decisive for the co-operative rotational pattern of the outer rotor 102 and the inner rotor 101.

The housing 111 is at a rear edge region 176 provided with a plurality of attachment holes 177 for bolts 178 for attachment of a rear cover 179 which covers the controlling gear arrangement 201. A bushing-like portion 180, which is integral with the cover 179, surrounds the drive shaft 116.

A roller bearing 181 is located between the drive shaft 116 and the inside of the portion 180. Further, a thrust bearing 182 is located between the drive shaft 166 and the inside of the portion 180. The thrust bearing 182 is kept in place by means of a locking ring 183. The free end of the bushing like portion 180 is terminated by an end lid 184 which is attached by means of bolts 185 to the free end of the portion 180. As shown on FIG. 11, the drive shaft 116 passes through the end lid 184 and a sim-ring 186 which threat forms sealing between the drive shaft 116 and the end lid 184.

As described in connection with FIG. 1, the device may be configured as a combustion engine, and wherein one of the end walls of the housing 104 is provided with a suction gate 123 for air, exhaust gate 126 and ignition device, e.g. spark plug 114 and/or injection nozzle 122 for the fuel, if diesel operation is an issue.

The combustion engine can be configured for operation according to an Otto-process.

It will be appreciated, based on viewing of FIG. 1 and FIG. 16, that the spark plug 114 or the nozzle 122 is located, radially viewed, on opposite side of the rotary axis 155 of the two rotors, relative to the suction- and exhaust gates 128, 129 which are associated with the respective manifolds 123, 126.

In the case of the device being configured as a compressor, such as shown on FIG. 17, one of the end walls 105 is provided with at least two fluid suction gates 172 and at least two fluid ejection gates 173. When the device is configured as a pump, such as shown on FIG. 18, one of the end walls is provided with at least two fluid suction gates 174 and at least two fluid ejection gates 175.

As shown on FIGS. 17 and 18 pairs of suction gates 172; 174 and ejection gates 173; 175 are neighbouring. Relative to the common rotary axis 155 of the two parts 101, 102, pairs of suction gates are located diametrically, and pairs of ejection ports are located diametrically.

With reference to FIG. 15 it will be observed that, for only a selected, non-limiting example, with constant rotational velocity being 3000 r.p.m. (revolutions per minute) for the drive shaft 116, the rotational velocity for the rotor 101 and the rotor 102 will vary between 2000 and 4000 revolutions per minute (r.p.m.) with a sinusoid variation, and where the velocities for the rotor 101 and the rotor 102 are in counter-phase and have the same velocity upon respective passing at 00, 90°, 180°, 270° and 360° of the rotation of the shaft 116. These sinusoidal variations are caused by the use of the elliptical gearwheels in the controlling gear arrangement.

The rotational velocity of the drive shaft 116 will thus be equal to the mean value of that of the rotors. The rotors thus swing mutually about the steady rotation of the drive shaft: the pressure forces during combustion cause a larger momentum to occur from the wing on that rotor which moves faster than the other, and this momentum is transferred to the drive shaft. As the rotors subsequent to each ignition (at that position which for each chamber may correspond to upper dead-point of a piston engine), change as regards to be the fastest, they appear alternately corresponding to piston top and top cover.

As a combustion engine, the device according to the invention has some features in common with a four-stroke piston engine, but is also remarkably different from such an engine.

The machine, according to the invention, has like piston engines a small combustion surface and relatively large sealing faces. Because the faces are so large and in addition do not touch each other, a labyrinth- and pressure trap sealing is possible, yielding that lubrication oil inside the chamber region advantageously can be omitted. Contrary to a four-stroke piston engine, each chamber performs suction, compression, expansion and ejection for each revolution. With four chambers as shown, the machine thus corresponds to—as regards cycles—an eight cylinder piston engine. With the invention, there is however required only one ignition device and no mechanically controlled valves.

For sake of simplicity, it is now referred to FIG. 16 as regards what is happening with one chamber 159 of the four chambers 159-162.

FIG. 16a represents an initial suction phase for fuel, e.g. mixture of petrol and air, related to the chamber 159, the chamber 159 being in a closed position just before suction is to start. A round spot indicates that chamber 159. The remaining three chambers 160-162 are in other parts of the cycle. In order to simplify the understanding we therefore follow only the chamber 159 through phases of suction, compression, ignition, combustion/expansion, and ejection of exhaust gases.

FIG. 16b represents an initial compression phase related to the chamber 159, the chamber 159 having completed suction through suction gate 128, and compression starts from the shown position, the suction gate being closed by the wing 147.

FIG. 16c represents a terminal compression phase related to the chamber 159, where the chamber 159 has much of its volume decreased and the fuel gas approaches the space at the ignition plug 114. If the engine is to operate as a diesel engine, there will be only air which is compressed and approaches an ignition device 114 in the form of an injection nozzle for controlled injection of diesel oil and subsequent spontaneous ignition and expansion of the mixture of diesel oil and air.

FIG. 16d represents an ignition- and explosion phase related to the chamber 159. In this phase the ignition plug 114 is uncovered towards the chamber 159, and dependent on rotational velocity a certain pre-ignition takes place, early if the rotational velocity is high, and somewhat later of the rotational velocity is low. If the engine, as alternative, is intended for diesel operation, the injection of diesel oil via the nozzle (which replaces the ignition plug 114) takes place relatively late close to the state of the chamber just before it reaches a minimum of volume. This is in order to have a sufficiently high compression for the diesel fuel together with compressed air to immediately ignite spontaneously. Only one single nozzle will be required for a diesel engine.

FIG. 16e represents an expansion phase related to the chamber 159, i.e. illustrating the chamber 159 during fuel combustion and thereby expansion.

FIG. 16f shows a blow-out phase related to the chamber 159, where the chamber 159 opens towards the exhaust outlet aperture or—gate 129 and in such a manner the combusted gases are ejected thereat.

It will be observed from FIG. 16e that there is started already a new suction phase with compression in FIG. 16f for the chamber 161 which is diagonally located relative to the chamber 159 which labelled with the black spot. The three other chambers 160, 161 and 162 perform the same cycle based process like that of the chamber 159, but they are in other phases during the rotation in that which is shown on FIG. 16a-16f. It will be observed that per revolution there takes place four four-stroke processes, yielding that the machine corresponds to an eight-cylinders four-stroke engine.

There is a great advantage in having all gas- or fluid exchange as well as ignition in the end cover 104 of the machine, as it is then avoided having apertures/gates towards the periphery of the outer rotor 102, something which would have caused a hot gas exposed passage to the surrounding housing 107. The latter problem is well known from the Wankel engine.

If FIG. 6 is once more studied, it will be noted that the air cooling being available there for the rotor 102 would have been more or less impossible if peripherally located suction- and exhaust-/ejection gates were to be used.

The inner rotor 101 is cooled by an oil passing through, entering via the inlet 138 on the front end lid 136 and dispersing in axial direction towards the interior of the housing 111, the oil on its way lubricating and cooling the bearings for the shafts of the rotors, and being drained out from the housing 111 via the outlet 120 together with lubrication oil which has entered the housing the nozzle stub 119.

As an engine, the machine according to the invention may use a turbo-charger almost similar to a piston engine in order to enhance the performance. The charger will in this case work under excellent dynamic conditions as the turbine part will receive an almost uniform flow of exhaust gas.

Due to touch-free rotors with pressure drop traps 148, 150, 151 and 157, the machine according to the invention may operate free of oil internally between the rotors. This is of great advantage as regards friction and emissions of pollutions to the environment, and yields little or no consumption of oil or replacement of oil because it in reality is not being polluted by combustion products.

FIGS. 17a and 17b are typically related to letting the machine function as a compressor, external power being delivered to the drive shaft 161.

FIG. 17a represents a suction phase for fluid, e.g. air and/or gas, related to the chamber 160, whereas FIG. 17b represents an ejection phase of compressed fluid, e.g. air and/or gas fluid, related to the chamber 160. Remaining chambers are present in other rotary phases, but the chambers 160 and 162 perform in reality simultaneously the same phases of compressor function, and correspondingly for the chambers 159 and 161.

As a compressor, the machine performs four suctions and four ejections per revolutions, corresponding to a four-cylinders piston engine. As two suctions and two ejections take place simultaneously and if the two suction gates 172 possibly have common supply manifold and the two ejection gates 173 possibly have common outlet manifold, cyclewise the machine is more so to consider as a two-cylinders compressor.

FIGS. 17a and 17b show, in the same manner as in FIGS. 16a-16f, that we, for a simple understanding of the operation follow a specific chamber, here the chamber 160, marked with a black spot, but here with a simpler progress.

In order to use the machine as a compressor, the end cover 105 is used with diametrically positioned sets of two suction gates 172 and two ejection gates 173. These corresponding gates can, as indicated above, either be interconnected or operate separately. An alternative to the modes of operation is also that the machine can be used to mix two different gases with separate suction inflow via the gates 172 and with common ejection via gates 173 which have a common outlet manifold, whereby two different gases having separate gates can be compressed, where the ratio between the gases can be controlled by choking the respective suction inflows. Obviously, the suction- and ejection gates 172 and 173, respectively interconnected as mentioned, compress one single gas with full capacity from all chambers and to a common outlet manifold.

The cycle is here quite simple, as in FIG. 17a the gas or gases (possibly just air alone or gas and air) being sucked in through the gates 172, being compressed and ejected thereafter out through the gates 173, as shown in FIG. 17b.

It should be mentioned that in order to obtain maximum efficiency through this usage, the geometrical ratio between the rotors, i.e. the formed chambers, can be changed to almost zero at smallest volume in the chambers. This can be done by e.g. increasing the width of the rotor wings, or change the ratio between largest and smallest dimension on the controlling elliptical gearwheels in the controlling gear arrangement 201. The latter may provide greater volume passed through. Adapted compression rate is determined by size, shape and location of the ejection apertures 173.

In a compressor the compression ratio is not used as a term, but instead the displacement ratio which indicates how much of the cylinder gross volume is displaced. The portion not being displaced is denoted as "harmful space". The displacement ratio in a compressor should be as high as possible in order to avoid harmful space to the extent possible. Due to this reason it may, as just mentioned, in the machine according to the present invention, be necessary also to change something on the configuration of the elliptical gearwheels in the controlling gear arrangement 201, in order to obtain largest displacement ratio possible.

It may be worth mentioning that upon a gas flow in opposite direction, the same embodiment of the machine may be used as a gas powered engine.

A corresponding situation like that just explained for FIGS. 17a and 17b is present for the pump solution which is illustrated with reference to FIG. 18a and FIG. 18b.

As an outset a pump, according to the invention, is like the compressor as regards structure, but with the difference that the outlets are changed to have same size and shape as the inlets. This is because the displacement must take place out from the chambers from when they are at largest volume until the reach the smallest volume. As previously described it is only required to switch the front cover 104 to the embodiment of the cover 106 in order to use the invention in pump version.

FIGS. 18a and 18b clearly illustrate that there are great similarities to the compressor application as shown on FIGS. 17a-17b. The significant differences are the shape and the size of the ejection gates 175, which are here shaped like the suction gates 174. This is due to liquid not being compressible in a way similar to that of air and/or gas, whereby ejection must start as soon as a decreasing of the chambers commences. Otherwise, the functions are identical to the compressor function in FIG. 17, but here in the pump function, the mixture ratio is difficult to control and can therefore be locked to 1:1.

The rotors 101 and 102 could possibly have had a larger number of wings, but in practice this will yield reduced displacement volume and increased surface exposed to heat, and as a combustion engine this will considerably increase the thermal losses, which therefore does not appear to yield any technical advantages when viewed in full. As a compressor a larger number of wings will on the contrary be desirable, as increased heat transfer during compression reduces the polytrophic index and thereby reduces the energy consumption.

The controlling gear arrangement 201 may possibly be constructed using technical solutions other than those implying elliptical gearwheels. As an example, the almost same movement can be obtained using circular gearwheels instead of elliptical, but where the center of rotation of the gearwheels in such a case is located eccentrically in the gearwheel. This will, however, yield an extremely complex structure and is in practice hardly practical or economical to carry out. The solution which is shown and described is therefore the one which is currently preferred, although also the previously described technical equivalent can be envisaged.

The machine can be made with multiple sets of rotors in axial direction, and also possibly have other fields of use than those described.

The invention provides a machine structure which solves problematic issues related to both sealing and surface ratios during a phase of combustion, such as free choice of compression ratio, while at the same time yielding a compact and light-weight structure which is vibration-less as regards mass-forces, and which exhibits to a large extent technical simplicity as well as few movable parts.

For sake of simplicity all gearwheels are shown without teeth, but it will be appreciated that such teeth are present. Whether the teeth are parallel with the axis of rotation of the gearwheel, are inclined relative to the axis of rotation, or have a V-shape, is a matter of choice of structure. Inclined teeth provide a larger gripping face for inter-engagement of the teeth and yield less operational noise, similarly to teeth having V-shape.

The invention claimed is:

1. Controlling gears arranged for driving a continuous, mutually variable movement of an outer rotor and an inner rotor which are co-axial, and the outer rotor and the inner rotor being in operational co-operation with a main drive shaft;
  wherein the rotary main drive shaft is in operational gearwheel coupling with a first rotary sub-drive shaft of the outer rotor and with a second rotary sub-drive shaft of the inner rotor, respectively, wherein co-operating elliptical gearwheels are included in the respective gearwheel coupling;
  wherein the main drive shaft and the first and sub-drive shaft and the second sub-drive shaft are co-axial;
  wherein the rotary main drive shaft is equipped with a fixedly attached elliptical gearwheel, wherein two first co-axial gearwheel sets are provided, each of the two first co-axial gearwheel sets comprising a rotary, elliptical gearwheel and a rotary, circular gearwheel which are fixedly interconnected with a first mutual axial distance, a rotation axis of the gearwheels being parallel to a rotation axis of the main drive shaft, the elliptical gearwheel of said each of the two first co-axial gearwheel sets forming gearwheel engagement with the elliptical gearwheel which is rigidly attached on the main drive shaft, and the circular gearwheel of said each of the two first co-axial gearwheel sets forming gearwheel engagement with a circular gearwheel on a first sub-drive shaft of the outer rotor for rotation thereof; and
  wherein two second co-axial gearwheel sets are provided, each of the two second co-axial gearwheel sets comprising a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of said each of the two second co-axial gearwheel sets forming gearwheel engagement with the elliptical gearwheel which is rigidly attached on the main drive shaft, and the circular gearwheel of said each of the two second co-axial gearwheel sets forming gearwheel engagement with a circular gearwheel on a second sub-drive shaft of the inner rotor for rotation thereof.

2. The controlling gears according to claim 1, wherein a difference between the first mutually axial distance and the second mutually axial distance corresponds at least to a thickness of the circular gearwheel which moves the sub-drive shaft off the inner rotor.

3. The controlling gears according to claim 1,
  wherein the controlling gears exhibit a continuous rotation movement which controls mutually varying movement of the outer rotor and the inner rotor; and
  wherein a rotation pattern of said outer rotor and said inner rotor is a function of a ratio of a largest diameter to a smallest diameter of the elliptical gearwheels of the at least first co-axial set and the at least one second set and of the elliptical gearwheel which is coupled to the main drive shaft.

4. Controlling gears in operational co-operation with a rotary machine to control two continuously rotating, mutually movable first and second co-axial functional parts in the rotary machine, thereby causing continuous, mutually variable movement in the rotary machine of the first functional part and the second functional part, the first and second functional parts being in operational co-operation with a rotary main drive shaft which forms part of the controlling gears, the main drive shaft being in operational gearwheel coupling with a first rotary sub-drive shaft for the first functional part and with a second rotary sub-drive shaft for the second functional part, respectively, the gearwheel coupling including therein co-operating elliptical gearwheels, and the rotary main drive shaft being equipped with a fixedly attached elliptical gearwheel;
  wherein the main drive shaft and the first and second sub-drive shafts are co-axial;
  wherein each of two first co-axial gearwheel sets comprises a rotary, elliptical gearwheel and a rotary, circular gearwheel which are fixedly interconnected with a first mutual axial distance, and a rotation axis of the gearwheels is parallel to a rotation axis of the main drive shaft;
    wherein the elliptical gearwheel of said each of the two first co-axial gearwheel sets forms gearwheel engagement with the elliptical gearwheel which is rigidly attached on the main drive shaft; and
    wherein the circular gearwheel of said each of the two first co-axial gearwheel set is gearwheel engaging with a circular gearwheel on a sub-drive shaft of the first functional part for rotation thereof; and
  wherein each of two second co-axial gearwheel sets comprises a rotary, elliptical gearwheel and a rotary, circular gearwheel which are fixedly interconnected with a second mutual axial distance, and a rotation axis of the gearwheels is parallel to a rotation axis of the main drive shaft,
    wherein the elliptical gearwheel of said each of the two second co-axial gearwheel sets is gearwheel engaging the elliptical gearwheel which is rigidly attached on the main drive shaft; and
    wherein the circular gearwheel of said each of the two second co-axial gearwheel sets is gearwheel engaging a circular gearwheel on a sub-drive shaft of the second functional part for rotation thereof.

5. The controlling gears according to claim 4, wherein a difference between the first and second mutually axial distances corresponds at least to a thickness of the circular gearwheel which moves the sub-drive shaft for the second part.

6. The controlling gears according to claim 4, wherein the controlling gears exhibit a continuous rotation movement which controls mutually varying movement of the first and second functional parts, the rotation pattern for the movements of these functional parts being a function of a ratio of a largest diameter to a smallest diameter of the elliptical gearwheels of the first and second sets and of the elliptical gearwheel which is fixedly attached on the main drive shaft.

7. A displacement type rotary internal combustion engine, comprising:
  a) a non-rotatable housing;
  b) two mutually movable rotors surrounded by the non-rotatable housing and including an outer rotor with an outer circumference being controllably rotationally movable along an inside wall of the non-rotatable housing, and an inner rotor being controllably movable relative to an inner circumferential face of the outer rotor; and
  c) a suction gate, an exhaust gate and at least one type of an ignition device positioned on the front cover the non-rotatable housing;
  wherein
  d) the outer rotor and the inner rotor have co-axial axes of rotation;

e) the outer rotor internally has at least two radially inwardly directed wings arranged with a mutual angular distance along a curved inside wall of the outer rotor between the at least two radially inwardly directed wings;
f) the inner rotor has a hub which has at least two radially outwardly directed wings arranged with a mutual angular distance;
g) the hub between the at least two radially outwardly directed wings of the inner rotor is in one of slidable and movable adjacent contact with a curved, free end portion of the at least two radially inwardly directed wings on the outer rotor;
h) a curved, free end portion of each the at least two radially outwardly directed wings on the inner rotor is in one of slidable and movable adjacent contact with a curved inside wall on the outer rotor which is located between respective ones of two neighbouring of the at least two radially inwardly directed wings on the outer rotor;
i) the outer rotor and the inner rotor are both continuously rotatable with mutually variable movement, the at least two radially outwardly directed wings of the inner rotor being movable between the at least two radially inwardly directed wings on the outer rotor, respectively, so that chambers which are created between co-operative pairs of the at least two radially inwardly directed wings on the outer rotor and the at least two radially outwardly directed wings on the inner rotor successively increase and decrease, and decrease and increase, respectively, in volume during the course of a rotation cycle of the created chambers;
j) one first axial end of the outer rotor and the inner rotor is in one of slidable and movable adjacent contact with a first cover forming the housing inside wall and having the suction gate for injecting one of air or air fuel mixture into the chambers, the exhaust gate for discharging exhaust gas out of the chambers, and the ignition device for combusting the air fuel mixture;
k) a second axial end of the outer rotor and the inner rotor is covered by a second cover, which is attached to the outer rotor and rotate therewith, wherein the inner rotor is in one of slidable and movable adjacent contact with the second cover; and
l) controlling gears are operationally co-operating with a rotatable main drive shaft of the displacement type rotary internal combustion engine to control movements of the outer rotor and the inner rotor.

8. The displacement type rotary internal combustion engine according to claim 7, wherein the ignition device is a spark plug.

9. The displacement type rotary internal combustion engine according to claim 7, wherein the displacement type rotary internal combustion engine is configured to be operated in an Otto-cycle.

10. The displacement type rotary internal combustion engine according to claim 7, wherein the ignition device is an injection nozzle for diesel.

11. The displacement type rotary internal combustion engine according to claim 7, wherein the ignition device is located, viewed radially, on opposite side of the rotation axis of the two mutually movable, rotary parts, relative to the suction—and exhaust gates.

12. The displacement type rotary internal combustion engine according to claim 7,
wherein the rotary main drive shaft is in operational gearwheel coupling with a first rotary sub-drive shaft of the outer rotor and with a second rotary sub-drive shaft of the inner rotor, respectively;
wherein co-operating elliptical gearwheels are included in the respective gearwheel coupling; and
wherein the main drive shaft and the first and second sub-drive shafts are co-axial.

13. The displacement type rotary internal combustion engine according to claim 7, wherein the controlling gears comprise:
the rotary main drive shaft which is equipped with a fixedly attached elliptical gearwheel;
two first co-axial gearwheel sets, each of the two first co-axial gearwheel sets comprising a rotary, elliptical gearwheel and a rotary, circular gearwheel which are fixedly interconnected with a first mutual axial distance, a rotation axis of the gearwheels being parallel to a rotation axis of the main drive shaft, the elliptical gearwheel of said each of the two first co-axial gearwheel sets forming gearwheel engagement with the elliptical gearwheel which is rigidly attached on the main drive shaft, and the circular gearwheel of said each of the two first co-axial gearwheel sets forming gearwheel engagement with a circular gearwheel on a first sub-drive shaft of the outer rotor for rotation thereof; and
two second co-axial gearwheel sets, each of the two second co-axial gearwheel sets comprising a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of said each of the two second co-axial gearwheel sets forming gearwheel engagement with the elliptical gearwheel which is rigidly attached on the main drive shaft, and the circular gearwheel of said each of the two second co-axial gearwheel sets forming gearwheel engagement with a circular gearwheel on a second sub-drive shaft of the inner rotor for rotation thereof.

14. The displacement type rotary internal combustion engine according to claim 13,
wherein the controlling gears exhibit a continuous rotational movement which controls a mutually varying movement of the outer rotor and the inner rotor; and
wherein a rotation pattern of the outer rotor and the inner rotor is a function of a ratio of a largest diameter to a smallest diameter of the elliptical gearwheels of said each of the two first co-axial gearwheel sets and sadi each of the two second co-axial gearwheel sets and the elliptical gearwheel being coupled to the main drive shaft.

15. The displacement type rotary internal combustion engine according to claim 7,
wherein the non-rotatable housing has at least one radially located aperture for blow-out of cooling air from at least one of the at least two radially inwardly directed wings in the outer rotor; and
wherein an outwardly facing portion of the at least one of the at least two radially inwardly directed wings is formed with a recess.

16. A displacement type compressor or pump, comprising:
a) a non-rotatable housing;
b) two mutually movable rotors including an outer rotor with an outer circumference being controllably rotationally movable along an inside wall of the non-rotatable housing, and an inner rotor being controllably movable relative to an inner circumferential face of the outer rotor; and c) at least two fluid suction gates and at least two fluid ejection gates positioned on the non-rotatable housing; wherein d) the outer rotor and the inner rotor have co-axial axes of rotation;

e) the outer rotor internally has at least two radially inwardly directed wings arranged with a mutual angular distance along a curved inside wall of the outer rotor between the at least two radially inwardly directed wings;

f) the inner rotor has a hub which has at least two radially outwardly directed wings arranged with a mutual angular distance;

g) the hub between the at least two radially outwardly directed wings of the inner rotor is in one of slidable and movable adjacent contact with a curved, free end portion of the at least two radially inwardly directed wings on the outer rotor;

h) a curved, free end portion of each the at least two radially outwardly directed wings on the inner rotor is in one of slidable and movable adjacent contact with a curved inside wall on the outer rotor which is located between respective ones of two neighbouring of the at least two radially inwardly directed wings on the outer rotor;

i) the outer rotor and the inner rotor are both continuously rotatable with mutually variable movement, the at least two radially outwardly directed wings of the inner rotor being movable between the at least two radially inwardly directed wings on the outer rotor, respectively, so that chambers which are created between co-operative pairs of the at least two radially inwardly directed wings on the outer rotor and the at least two outwardly directed wings on the inner rotor successively increase and decrease, and decrease and increase, respectively, in volume during the course of a rotation cycle of the created chambers;

j) one first axial end of the outer rotor and the inner rotor is in one of slidable and movable adjacent contact with a first cover forming the housing inside wall having the at least two inlet fluid suction gates for injecting fluid into the chambers and the at least two fluid ejection gates for discharging fluid out of the chambers;

k) a second axial end of the outer rotor and the inner rotor is covered by a second cover, which is attached to the outer rotor and rotate therewith, wherein the inner rotor is in one of slidable and movable adjacent contact with the second cover;

l) pressure drop grooves are provided on faces of each of the at least two radially inwardly directed wings of the outer rotor and each of the at least two radially outwardly directed wings of the inner rotor, the pressure drop grooves being provided on two of the faces on the at least two radially outwardly directed wings of the inner rotor which are facing the first cover and the second cover, respectively;

on one of the faces on the at least two radially inwardly directed wings of the outer rotor which is facing the first cover; and on a radial end face of the at least two radially inwardly directed wings on the outer rotor facing the hub on the inner rotor, and at a radial end face of the at least two radially outwardly directed wings of the inner rotor facing an inside circumference portion of the outer rotor; and m) controlling gears operationally are co-operating with a rotatable main drive shaft of the displacement type rotary machine to control movements of the outer rotor and the inner rotor.

17. The displacement type compressor or pump according to claim 16, wherein pairs of the at least two fluid suction gates and the at least two fluid ejection gates are neighboring.

18. The displacement type compressor or pump according to claim 16,
wherein the at least two fluid suction gates are located diametrically relative to a rotation axis of the outer rotor and the inner rotor; and
wherein the at least two fluid ejection gates are located diametrically relative to the rotation axis of the outer rotor and the inner rotor.

19. The displacement type compressor or pump according to claim 16,
wherein the rotary main drive shaft is in operational gearwheel coupling with a first rotary sub-drive shaft of the outer rotor and with a second rotary sub-drive shaft of the inner rotor; respectively,
wherein co-operating elliptical gearwheels are included in the respective gearwheel coupling; and
wherein the main drive shaft and the first and second sub-drive shafts are co-axial.

20. The displacement type compressor or pump according to claim 19,
wherein the controlling gears exhibit a continuous rotational movement which controls a mutually varying movement of the outer rotor and the inner rotor; and
wherein a rotation pattern of the outer rotor and the inner rotor is a function of a ratio of a largest diameter to a smallest diameter of the elliptical gearwheels of the at least one first co-axial set and the at least one second co-axial set and of the elliptical gearwheel which is coupled to the main drive shaft.

21. The displacement type compressor or pump according to claim 16, wherein the controlling gears comprise:
the rotary main drive shaft which is equipped with a fixedly attached elliptical gearwheel;
two first co-axial gearwheel sets, each of the two first co-axial gearwheel sets comprising a rotary, elliptical gearwheel and a rotary, circular gearwheel which are fixedly interconnected with a first mutual axial distance, a rotation axis of the gearwheels being parallel to a rotation axis of the main drive shaft, the elliptical gearwheel of said each of the two first co-axial gearwheel sets forming gearwheel engagement with the elliptical gearwheel which is rigidly attached on the main drive shaft, and the circular gearwheel of said each of the two first co-axial gearwheel sets forming gearwheel engagement with a circular gearwheel on a first sub-drive shaft of the outer rotor for rotation thereof; and
two second co-axial gearwheel sets, each of the two second co-axial gearwheel sets comprising a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of said each of the two second co-axial gearwheel sets forming gearwheel engagement with the elliptical gearwheel which is rigidly attached on the main drive shaft, and the circular gearwheel of said each of the two second co-axial gearwheel sets forming gearwheel engagement with a circular gearwheel on a second sub-drive shaft of the inner rotor for rotation thereof.

22. The displacement type compressor or pump according to claim 16,
wherein the non-rotatable housing has at least one radially located aperture for blow-out of cooling air from at least one of the at least two radially inwardly directed wings in the outer rotor; and
wherein an outwardly facing portion of the at least one of the at least two radially inwardly directed wings is formed with a recess.

23. A displacement type rotary machine, comprising:
a) a non-rotatable housing;
b) two mutually movable rotors surrounded by the non-rotatable housing, and including an outer rotor with an outer circumference being controllably rotationally movable along an inside wall of the non-rotatable housing, and an inner rotor being controllably movable relative to an inner circumferential face of the outer rotor; and
c) at least one inlet aperture and at least one outlet aperture associated with the non-rotatable housing, wherein
d) the outer rotor and the inner rotor have co-axial axes of rotation;
e) the outer rotor internally has at least two radially inwardly directed wings arranged with a mutual angular distance along a curved inside wall of the outer rotor part between the at least two radially inwardly directed wings;
f) the inner rotor has a hub which has at least two radially outwardly directed wings arranged with a mutual angular distance;
g) the hub between the at least two radially outwardly directed wings of the inner rotor is in one of slidable and movable adjacent contact with a curved, free end portion of the at least two radially inwardly directed wings on the outer rotor;
h) a curved, free end portion of each the at least two radially outwardly directed wings on the inner rotor is in one of slidable and movable adjacent contact with a curved inside wall on the outer rotor which is located between respective ones of two neighbouring of the at least two radially inwardly directed wings on the outer rotor;
i) the outer rotor and the inner rotor are both continuously rotatable with mutually variable movement, the at least two radially outwardly directed wings of the inner rotor being movable between the at least two radially inwardly directed wings on the outer rotor, respectively, so that chambers which are created between co-operative pairs of the at least two radially inwardly directed wings on the outer rotor and the at least two radially outwardly directed wings on the inner rotor successively increase and decrease, and decrease and increase, respectively, in volume during the course of a rotation cycle of the created chambers;
j) one first axial end of the outer rotor and the inner rotor is in one of slidable and movable adjacent contact with a first cover forming the inside wall the housing, the first cover having the at least one inlet aperture for injecting fluid into the chambers and the at least one outlet aperture for discharging fluid out of the chambers;

k) a second axial end of the outer rotor and the inner rotor is covered by a second cover, which is attached to the outer rotor, and rotate therewith; wherein the inner rotor is in one of slidable and movable adjacent contact with the second cover;
l) the non-rotatable housing has at least one radially located aperture for blow-out of cooling air from at least one of the at least two radially inwardly directed wings in the outer rotor, and wherein an outwardly facing portion of the at least one of the at least two radially inwardly directed wings is formed with a recess; and
m) controlling gears are operationally co-operating with a rotatable main drive shaft of the displacement type rotary machine to control movements of the outer rotor and the inner rotor.

24. The displacement type rotary machine according to claim 23,
wherein pressure drop grooves are provided on faces of each of the at least two radially inwardly directed wings of the outer rotor and each of the at least two radially outwardly directed wings of the inner rotor;
wherein the pressure drop grooves are provided on two of the faces on the at least two radially outwardly directed wings of the inner rotor which are facing the first cover and the second cover, respectively, and on one of the faces on the at least two radially inwardly directed wings of the outer rotor which is facing the first cover; and
wherein further pressure drop grooves are provided on a radial end face of the at least two radially inwardly directed wings on the outer rotor facing the hub on the inner rotor, and at a radial end face of the at least two radially outwardly directed wings of the inner rotor facing an inside circumference portion of the outer rotor.

25. A displacement type rotary internal combustion engine, comprising:
a) a non-rotatable housing;
b) two mutually movable rotors surrounded by the non-rotatable housing and including an outer rotor with an outer circumference being controllably rotationally movable along an inside wall of the non-rotatable housing, and an inner rotor being controllably movable relative to an inner circumferential face of the outer rotor; and
c) a suction gate, an exhaust gate and at least one type of an ignition device positioned on the front cover the non-rotatable housing, wherein d) the outer rotor and the inner rotor have co-axial axes of rotation;
wherein
e) the outer rotor internally has at least two radially inwardly directed wings arranged with a mutual angular distance along a curved inside wall of the outer rotor between the at least two radially inwardly directed wings;
f) the inner rotor has a hub which has at least two radially outwardly directed wings arranged with a mutual angular distance;
g) the hub between the at least two radially outwardly directed wings of the inner rotor is in one of slidable and movable adjacent contact with a curved, free end portion of the at least two radially inwardly directed wings on the outer rotor;
h) a curved, free end portion of each the at least two radially outwardly directed wings on the inner rotor is in one of slidable and movable adjacent contact with a curved inside wall on the outer rotor which is located between respective ones of two neighbouring of the at least two radially inwardly directed wings on the outer rotor;

i) the outer rotor and the inner rotor are both continuously rotatable with mutually variable movement, the at least two radially outwardly directed wings of the inner rotor being movable between the at least two radially inwardly directed wings on the outer rotor, respectively, so that chambers which are created between co-operative pairs of the at least two radially inwardly directed wings on the outer rotor and the at least two radially outwardly directed wings on the inner rotor successively increase and decrease, and decrease and increase, respectively, in volume during the course of a rotation cycle of the created chambers;

j) one first axial end of the outer rotor and the inner rotor is in one of slidable and movable adjacent contact with a first cover forming the housing inside wall and having the suction gate for injecting one of air or air fuel mixture into the chambers, the exhaust gate for discharging exhaust gas out of the chambers, and the ignition device for combusting the airfuel mixture;

k) a second axial end of the outer rotor and the inner rotor is covered by a second cover, which is attached to the outer rotor and rotate therewith, wherein the inner rotor is in one of slidable and movable adjacent contact with the second cover;

l) the non-rotatable housing has at least one radially located aperture for blow-out of cooling air from one of the at least two radially inwardly directed wings in the outer rotor, and wherein an outwardly facing portion of the one of the at least two radially inwardly directed wings is formed with a recess; and m) controlling gears are operationally co-operating with a rotatable main drive shaft of the displacement type rotary internal combustion engine to control movements of the outer rotor and the inner rotor.

26. A displacement type rotary internal combustion engine according to claim 25, wherein the controlling gears comprise:

the rotary main drive shaft which is equipped with a fixedly attached elliptical gearwheel;

two first co-axial gearwheel sets, each of thw two first co-axial gearwheel sets comprising rotary, elliptical gearwheel and a rotary, circular gearwheel which are fixedly interconnected with a first mutual axial distance, a rotation axis of the gearwheels being parallel to a rotation axis of the main drive shaft, the elliptical gearwheel of said each of the two first co-axial sets forming gearwheel engagement with the elliptical gearwheel which is rigidly attached on the main drive shaft, and the circular gearwheel of said each of two the first co-axial gearwheel sets forming gearwheel engagement with a circular gearwheel on a first sub-drive shaft of the outer rotor for rotation thereof; and two second co-axial gearwheel sets, each of the two second co-axial gearwheel sets comprising a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of said each of the two second co-axial gearwheel sets forming gearwheel engagement with the elliptical gearwheel which is rigidly attached on the main drive shaft, and the circular gearwheel of said each of the two second co-axial gearwheel sets forming gearwheel engagement with a circular gearwheel on a second sub-drive shaft of the inner rotor for rotation thereof; and wherein the main drive shaft and the first and second sub-drive shafts being co-axial when the rotary main drive shaft is in operational gearwheel coupling with the first rotary sub-drive shaft of the outer rotor and with the second rotary sub-drive shaft of the inner rotor, respectively.

27. A displacement type rotary internal combustion engine, comprising:

a) a non-rotatable housing;

b) two mutually movable rotors surrounded by the non-rotatable housing and including an outer rotor with an outer circumference being controllably rotationally movable along an inside wall of the non-rotatable housing, and an inner rotor being controllably movable relative to an inner circumferential face of the outer rotor; and c) a suction gate, an exhaust gate and at least one type of an ignition device positioned on the front cover the non-rotatable housing;

wherein d) the outer rotor and the inner rotor have co-axial axes of rotation;

e) the outer rotor internally has at least two radially inwardly directed wings arranged with a mutual angular distance along a curved inside wall of the outer rotor between the at least two radially inwardly directed wings;

f) the inner rotor has a hub which has at least two radially outwardly directed wings arranged with a mutual angular distance;

g) the hub between the at least two radially outwardly directed wings of the inner rotor is in one of slidable and movable adjacent contact with a curved, free end portion of the at least two radially inwardly directed wings on the outer rotor;

h) a curved, free end portion of each the at least two radially outwardly directed wings on the inner rotor is in one of slidable and movable adjacent contact with a curved inside wall on the outer rotor which is located between respective ones of two neighbouring of the at least two radially inwardly directed wings on the outer rotor;

i) the outer rotor and the inner rotor are both continuously rotatable with mutually variable movement, the at least two radially outwardly directed wings of the inner rotor being movable between the at least two radially inwardly directed wings on the outer rotor, respectively, so that chambers which are created between co-operative pairs of the at least two radially inwardly directed wings on the outer rotor and the at least two radially outwardly directed wings on the inner rotor successively increase and decrease, and decrease and increase, respectively, in volume during the course of a rotation cycle of the created chambers;

j) one first axial end of the outer rotor and the inner rotor is in one of slidable and movable adjacent contact with a first cover forming the housing inside wall and having the suction gate for injecting one of air or air fuel mixture into the chambers, the exhaust gate for discharging exhaust gas out of the chambers, and the ignition device for combusting the airfuel mixture;

k) a second axial end of the outer rotor and the inner rotor is covered by a second cover, which is attached to the outer rotor and rotate therewith, wherein the inner rotor is in one of slidable and movable adjacent contact with the second cover;

l) pressure drop grooves are provided on faces of each of the at least two radially inwardly directed wings of the outer rotor and each of the at least two radially outwardly directed wings of the inner rotor, the pressure drop grooves being provided on two of the faces on the at least two radially outwardly directed wings of the inner rotor which are facing the first cover and the second cover, respectively; and on one of the faces on the at least two radially inwardly directed wings of the outer rotor which is facing the first cover; and with further pressure drop grooves being provided on a radial end face of the at least two radially inwardly directed wings on the outer rotor facing the hub on the inner rotor, and at a radial end face of the at least two radially outwardly directed wings of the inner rotor facing an inside circumference portion of the outer rotor; and m) controlling gears are operationally co-operating with a rotatable main drive shaft of the displacement type rotary internal combustion engine to control movements of the outer rotor and the inner rotor.

28. A displacement type rotary internal combustion engine according to claim 27, wherein the controlling gears comprise:

the rotary main drive shaft which is equipped with a fixedly attached elliptical gearwheel;

two first co-axial gearwheel sets, each of the two first co-axial gearwheel sets comprising rotary, elliptical gearwheel and a rotary, circular gearwheel which are fixedly interconnected with a first mutual axial distance, a rotation axis of the gearwheels being parallel to a rotation axis of the main drive shaft, the elliptical gearwheel of said each of the two first co-axial gearwheel sets forming gearwheel engagement with the elliptical gearwheel which is rigidly attached on the main drive shaft, and the circular gearwheel of said each of the two first co-axial gearwheel sets forming gearwheel engagement with a circular gearwheel on a first sub-drive shaft of the outer rotor for rotation thereof; and two second co-axial gearwheel sets, each of the two second co-axial gearwheel sets comprising a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of said each of the two second co-axial gearwheel sets forming gearwheel engagement with the elliptical gearwheel which is rigidly attached on the main drive shaft, and the circular gearwheel of said each of the two second co-axial gearwheel sets forming gearwheel engagement with a circular gearwheel on a second sub-drive shaft of the inner rotor for rotation thereof; and wherein the main drive shaft and the first and second sub-drive shafts being co-axial when the rotary main drive shaft is in operational gearwheel coupling with the first rotary sub-drive shaft of the outer rotor and with the second rotary sub-drive shaft of the inner rotor, respectively.

29. A displacement type rotary machine, comprising:

a) a non-rotatable housing;

b) two mutually movable rotors surrounded by the non-rotatable housing and including an outer rotor with an outer circumference being controllably rotationally movable along an inside wall of the non-rotatable housing, and an inner rotor being controllably movable relative to an inner circumferential face of the outer rotor; and c) at least one inlet aperture and at least one outlet aperture associated with a wall of the non-rotatable housing;

wherein d) the outer rotor and the inner rotor have co-axial axes of rotation;

e) the outer rotor internally has at least two radially inwardly directed wings arranged with a mutual angular distance along a curved inside wall of the outer rotor between the at least two radially inwardly directed wings;

f) the inner rotor has a hub which has at least two radially outwardly directed wings arranged with a mutual angular distance;

g) the hub between the at least two radially outwardly directed wings of the inner rotor is in one of slidable and movable adjacent contact with a curved, free end portion of the at least two radially inwardly directed wings on the outer rotor;

h) a curved, free end portion of each the at least two radially outwardly directed wings on the inner rotor is in one of slidable and movable adjacent contact with a curved inside wall on the outer rotor which is located between respective ones of two neighbouring of the at least two radially inwardly directed wings on the outer rotor;

i) the outer rotor and the inner rotor are both continuously rotatable with mutually variable movement, the at least two radially outwardly directed wings of the inner rotor being movable between the at least two radially inwardly directed wings on the outer rotor, respectively, so that chambers which are created between co-operative pairs of the at least two radially inwardly directed wings on the outer rotor and the at least two radially outwardly directed wings on the inner rotor successively increase and decrease, and decrease and increase, respectively, in volume during the course of a rotation cycle of the created chambers, j) one first axial end of the outer rotor and the inner rotor is in one of slidable and movable adjacent contact with a first cover forming the housing inside wall and having the at least one inlet aperture for injecting fluid into the chambers and the at least one outlet aperture for discharging fluid out of the chambers;

k) a second axial end of the outer rotor and the inner rotor is covered by a second cover, which is attached to the outer rotor, and rotate therewith;

wherein the inner rotor is in one of slidable and movable adjacent contact with the second cover;

l) controlling gears operationally co-operating with a rotatable main drive shaft of the displacement type rotary machine to control movements of the outer rotor and the inner rotor, and wherein the controlling gears comprise:

the rotary main drive shaft which is equipped with a fixedly attached elliptical gearwheel;

two first co-axial gearwheel sets, each of the two first co-axial gearwheel sets comprising a rotary, elliptical gearwheel and a rotary, circular gearwheel which are fixedly interconnected with a first mutual axial distance, a rotation axis of the gearwheels being parallel to a rotation axis of the main drive shaft, the elliptical gearwheel of said each of the two first co-axial gearwheel sets forming gearwheel engagement with the elliptical gearwheel which is rigidly attached on the main drive shaft, and the circular gearwheel of said each of the two first co-axial gearwheel sets forming gearwheel engagement with a circular gearwheel on a first sub-drive shaft of the outer rotor for rotation thereof; and two second co-axial gearwheel sets, each of the two second co-axial gearwheel sets comprising a rotary, elliptical gearwheel and a rotary, circular gearwheel which are fixedly interconnected with a second mutual axial distance, a rotation axis of the gearwheels being parallel to a rotation axis of the main drive shaft, the elliptical gearwheel of said each of the two second co-axial gearwheel sets forming gearwheel engagement with the elliptical gearwheel which is rigidly attached on the main drive shaft, and the circular gearwheel of said each of the two second co-axial gearwheel sets forming gearwheel engagement with a circular gearwheel on a second sub-drive shaft of the inner rotor for rotation thereof;

wherein the main drive shaft and the first and second sub-drive shafts being co-axial when the rotary main drive shaft is in operation gearwheel coupling with the first rotary sub-drive shaft of the outer rotor and with the second rotary sub-drive shaft of the inner rotor.

30. The displacement type rotary machine according to claim 29,
wherein the controlling gears exhibit a continuous rotational movement which controls a mutually varying movement of the outer rotor and the inner rotor; and
wherein a rotation pattern of the outer rotor and the inner rotor is a function of a ratio of a largest diameter to a smallest diameter of the elliptical gearwheels of the at least one first co-axial set and the at least one second co-axial set and of the elliptical gearwheel which is coupled to the main drive shaft.

31. The displacement type rotary machine according to claim 29, wherein the non-rotatable housing has at least one radially located aperture for blow-out of cooling air from one of the at least two radially inwardly directed wings in the outer rotor, and wherein an outwardly facing portion of the one of the at least two radially inwardly directed wings is formed with a recess.

* * * * *

UNITED STATES PATENT AND TRADEMARK OFFICE
CERTIFICATE OF CORRECTION

| | |
|---|---|
| PATENT NO. | : 10,184,474 B2 |
| APPLICATION NO. | : 14/762141 |
| DATED | : January 22, 2019 |
| INVENTOR(S) | : Hilberg I. Karoliussen |

Page 1 of 1

It is certified that error appears in the above-identified patent and that said Letters Patent is hereby corrected as shown below:

In the Claims

In Column 15, Claim 2, Line 49, immediately after "shaft" and immediately before "the", please delete "off" and insert --of--.

Signed and Sealed this
Twenty-first Day of April, 2020

Andrei Iancu
*Director of the United States Patent and Trademark Office*